(12) United States Patent
Chan et al.

(10) Patent No.: US 10,367,296 B2
(45) Date of Patent: Jul. 30, 2019

(54) MODULAR ELECTRICAL POWER SUPPLY AND CONTROL SYSTEM

(71) Applicant: ECCO DESIGN INC., New York, NY (US)

(72) Inventors: Eric Chan, New York, NY (US); Michael Morath, Baden-Wuerttemberg (DE)

(73) Assignee: ECCO DESIGN, INC., New York, NY (US)

( * ) Notice: Subject to any disclaimer, the term of this patent is extended or adjusted under 35 U.S.C. 154(b) by 0 days.

(21) Appl. No.: 16/079,260

(22) PCT Filed: Mar. 6, 2017

(86) PCT No.: PCT/US2017/020977
§ 371 (c)(1),
(2) Date: Aug. 23, 2018

(87) PCT Pub. No.: WO2017/152183
PCT Pub. Date: Sep. 8, 2017

(65) Prior Publication Data
US 2019/0103702 A1    Apr. 4, 2019

Related U.S. Application Data

(60) Provisional application No. 62/303,927, filed on Mar. 4, 2016, provisional application No. 62/303,943, filed (Continued)

(51) Int. Cl.
*G06F 1/26*    (2006.01)
*H01R 13/62*   (2006.01)
(Continued)

(52) U.S. Cl.
CPC .......... *H01R 13/6205* (2013.01); *F21S 6/003* (2013.01); *G06F 1/26* (2013.01);
(Continued)

(58) Field of Classification Search
CPC ...... H01R 13/514; H01R 13/66; H01R 13/64; H01R 13/629; H01R 13/6205;
(Continued)

(56) References Cited

U.S. PATENT DOCUMENTS 8,734,165 B2 * 5/2014 Neel ................... H01R 11/30
439/39
9,101,071 B2 * 8/2015 Wu ..................... H05K 1/165
(Continued)

FOREIGN PATENT DOCUMENTS

JP      2009-205912 A    9/2009

OTHER PUBLICATIONS

International Search Report and Written Opinion dated Jun. 14, 2017, from International Application No. PCT/US2017/020977, 9 sheets.

*Primary Examiner* — Gary F Paumen
(74) *Attorney, Agent, or Firm* — Katten Muchin Rosenman LLP

(57) ABSTRACT

The modular power electrical system provides a plurality of base modules, connectors, and functional device modules, and mating modules which can be connected together to provide a fully reconfigurable power transfer system. A magnetic connection is used to connect the devices together and to transmit power some embodiments. Methods for controlling the modules are also described.

13 Claims, 33 Drawing Sheets

Related U.S. Application Data on Mar. 4, 2016, provisional application No. 62/397,629, filed on Sep. 21, 2016.

(51) Int. Cl.
  *H05B 37/02* (2006.01)
  *H01R 13/514* (2006.01)
  *F21S 6/00* (2006.01)
  F21Y 115/10 (2016.01)

(52) U.S. Cl.
  CPC ....... *H01R 13/514* (2013.01); *H05B 37/0272* (2013.01); *F21Y 2115/10* (2016.08)

(58) Field of Classification Search
  CPC .......... H01R 11/30; H01R 24/64; H05K 1/18; H05K 3/30; H05K 7/00; G06F 1/26; H05B 37/0272
  USPC ....... 439/38–40; 335/285–290, 295; 336/200
  See application file for complete search history.

(56) References Cited

U.S. PATENT DOCUMENTS

| | | | |
|---|---|---|---|
| 9,307,664 B2 * | 4/2016 | Lin | H05K 7/00 |
| 9,385,485 B2 * | 7/2016 | Hsu | H01R 13/665 |
| 2011/0122589 A1 | 5/2011 | Wu et al. | |
| 2012/0282786 A1 | 11/2012 | Neel | |
| 2014/0055931 A1 | 2/2014 | Lin et al. | |
| 2015/0171564 A1 | 6/2015 | Hsu et al. | |

* cited by examiner

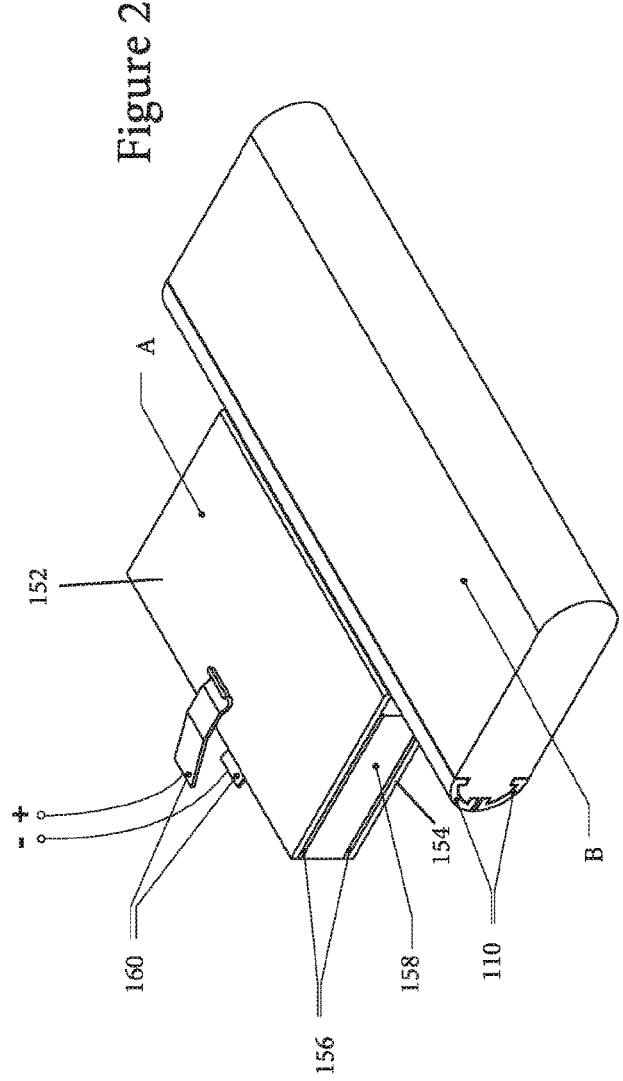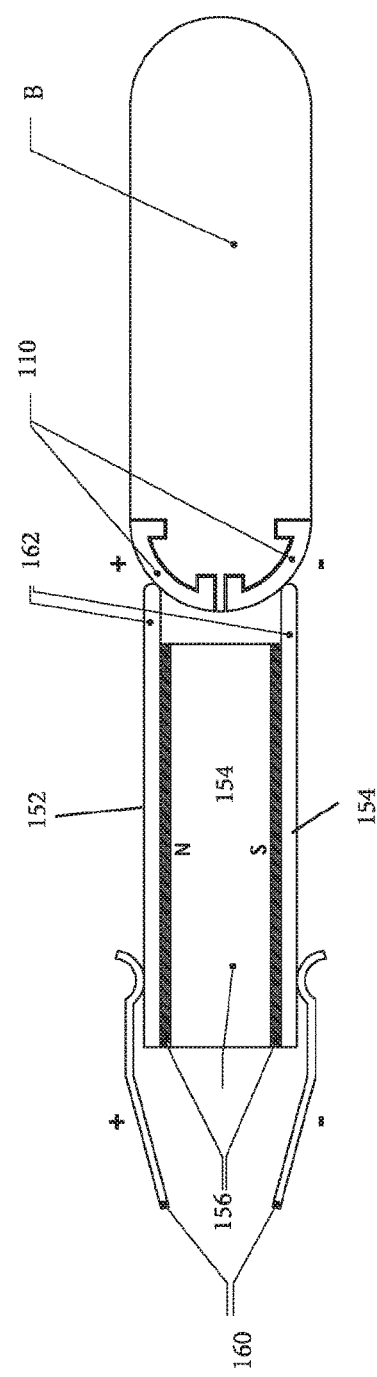

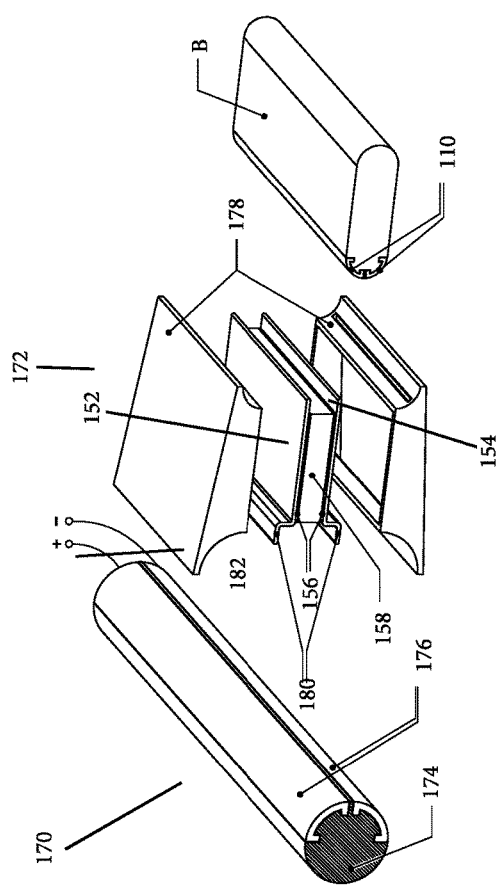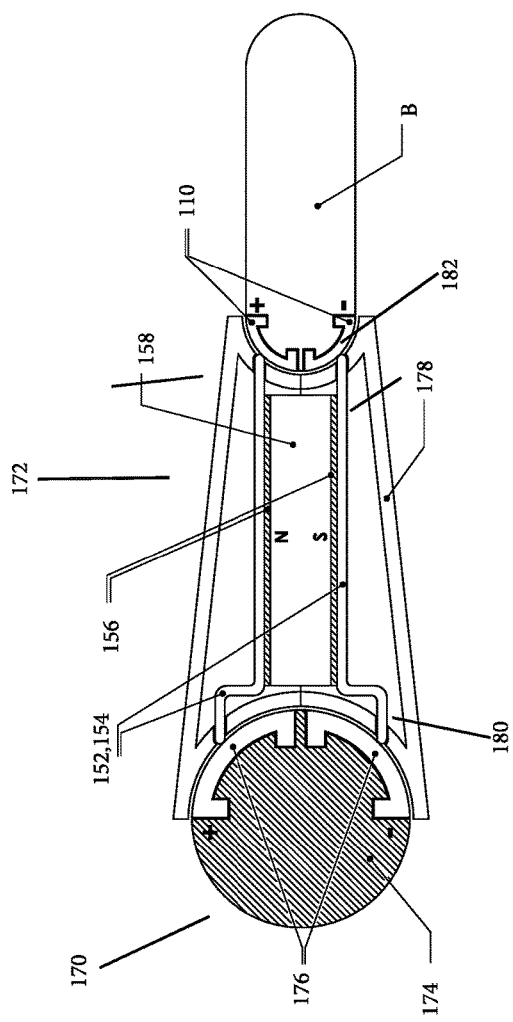

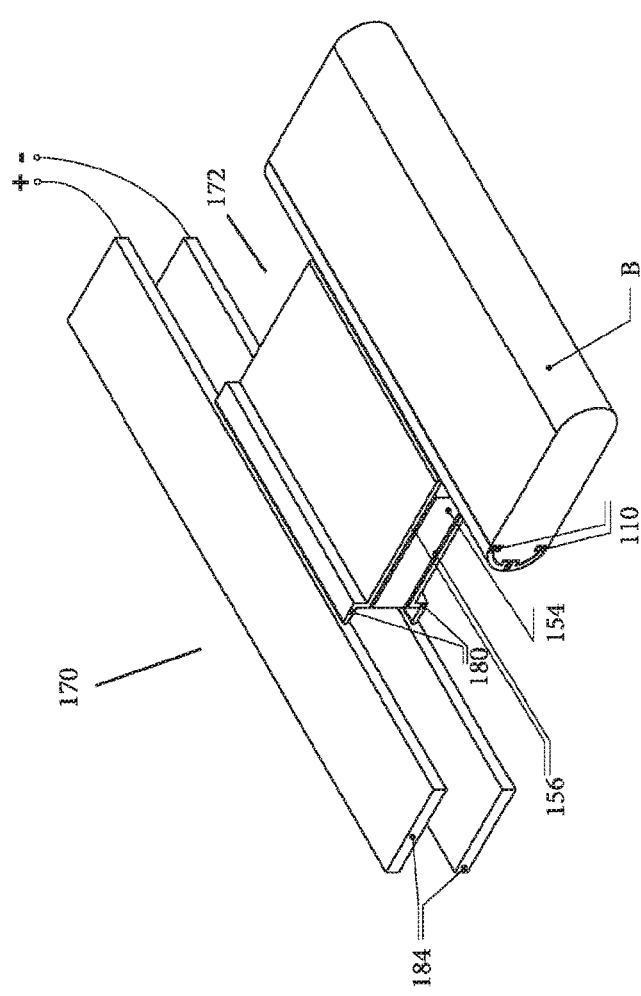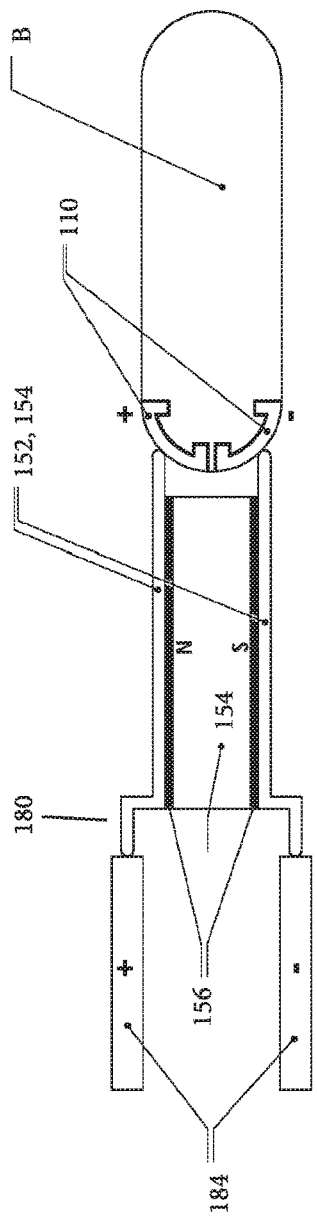

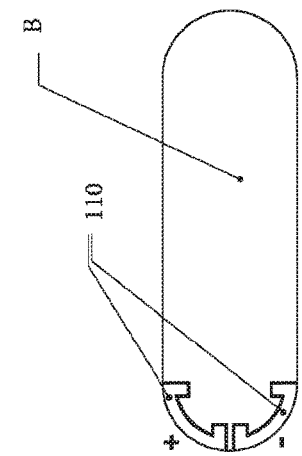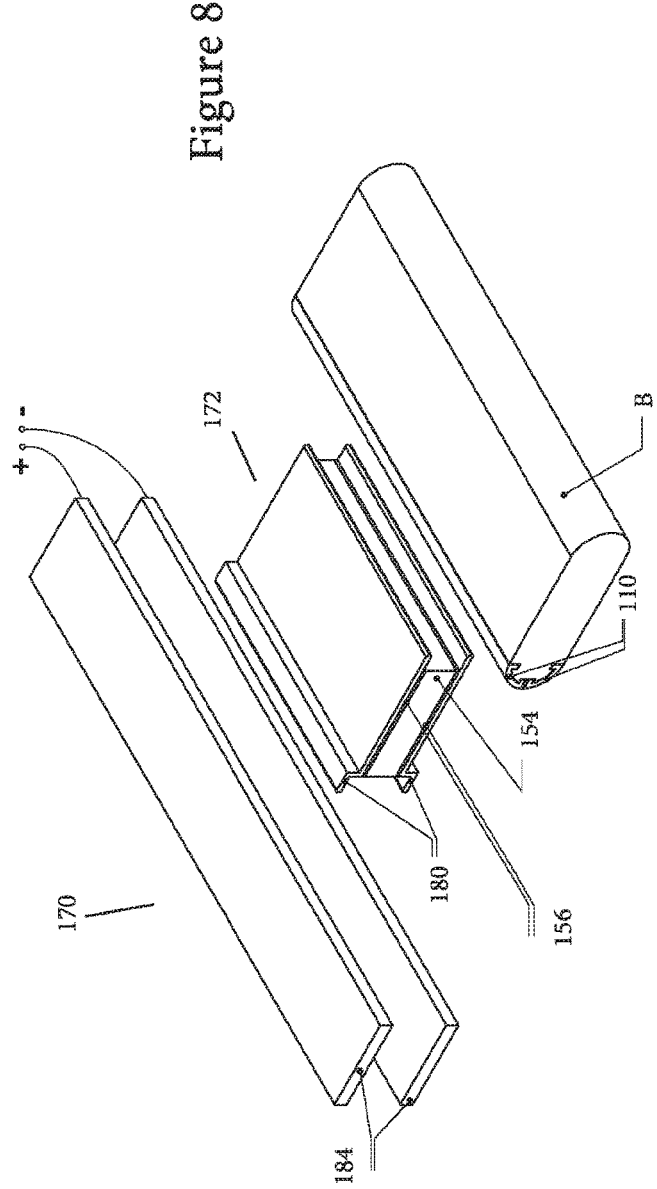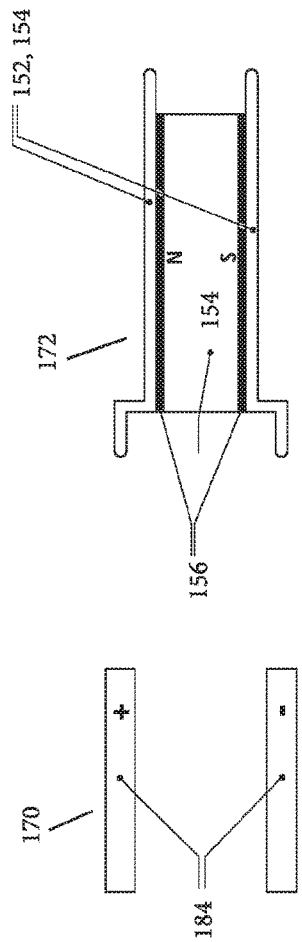

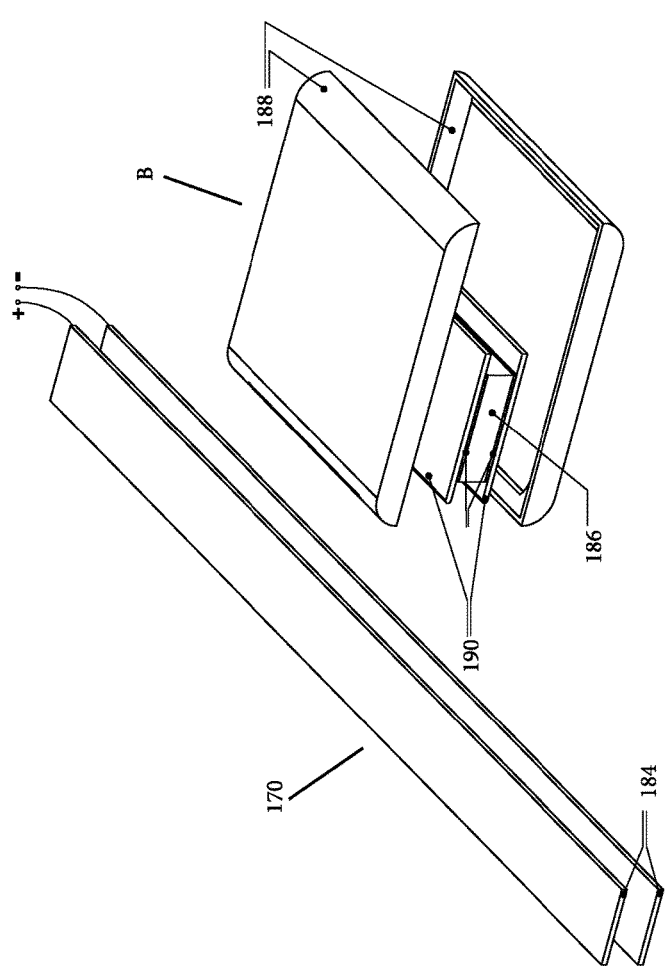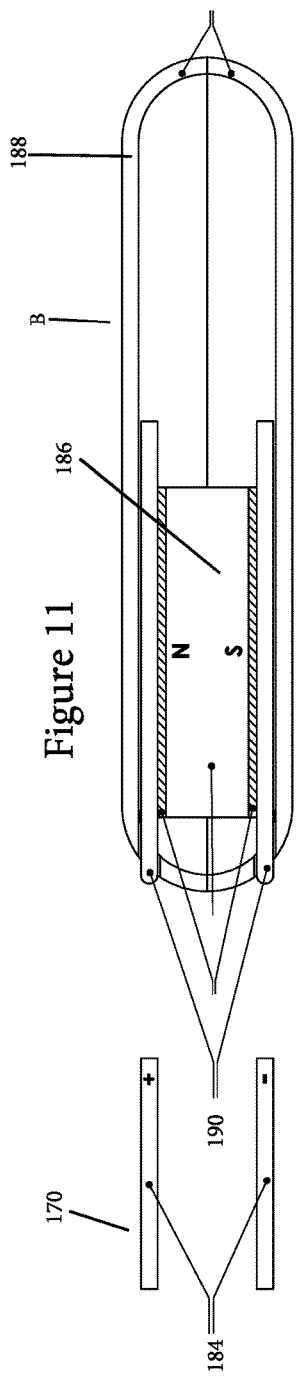

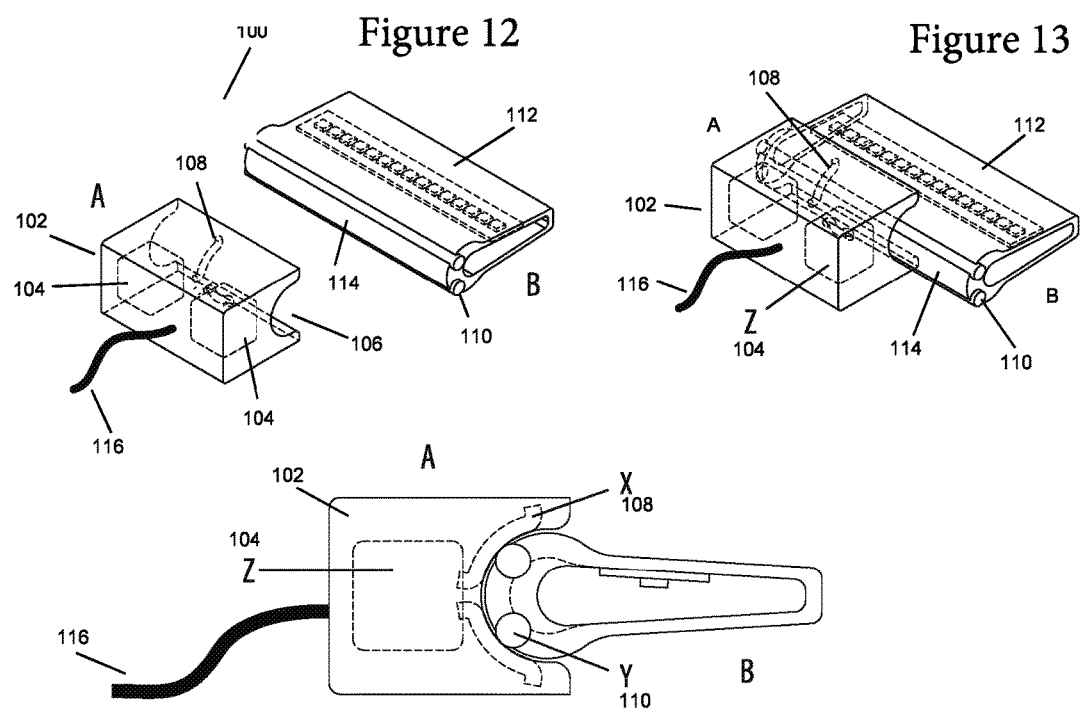

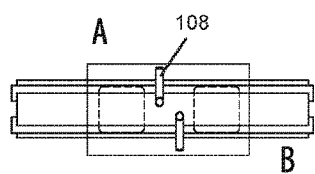
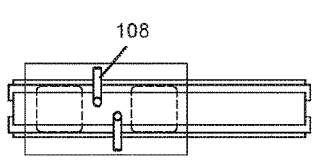
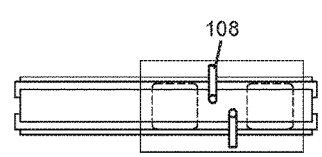
Figure 21
Figure 22
Figure 23

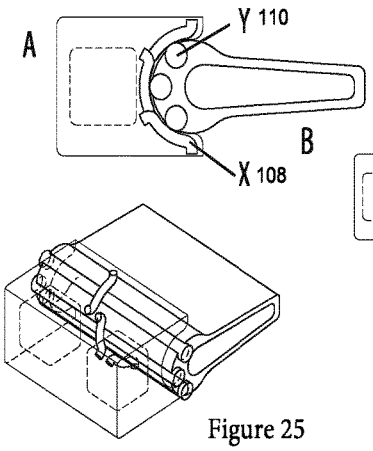
Figure 24
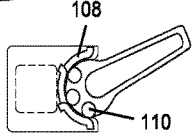
Figure 27
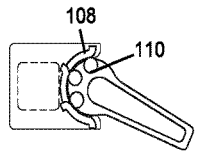
Figure 28
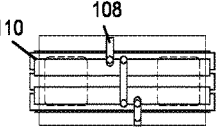
Figure 26
Figure 25
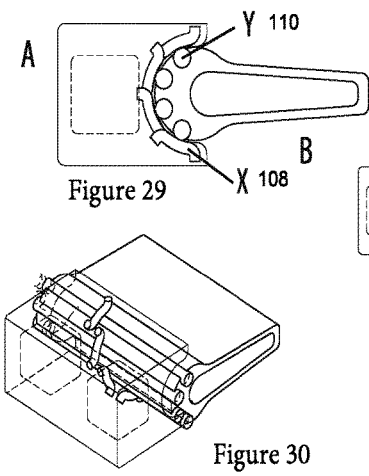
Figure 29
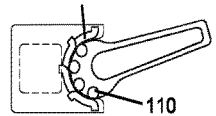
Figure 32
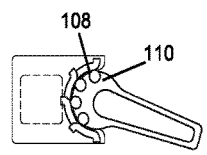
Figure 33
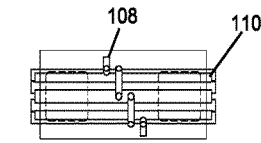
Figure 31
Figure 30
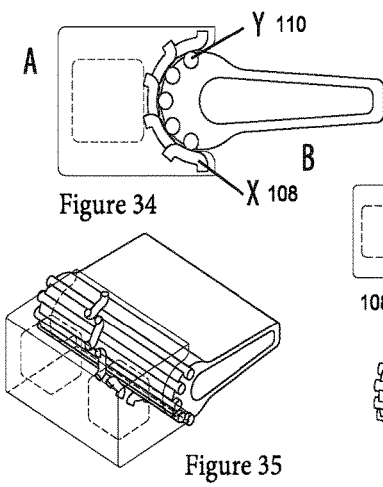
Figure 34
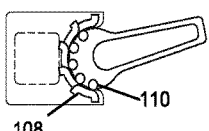
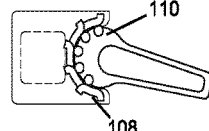
Figure 36
Figure 35
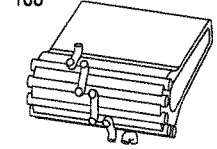
Figure 37
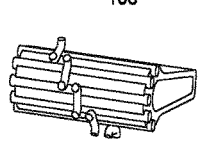
Figure 38
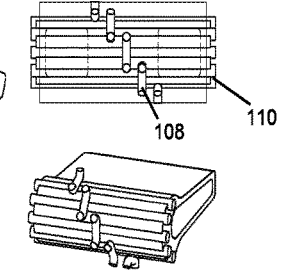

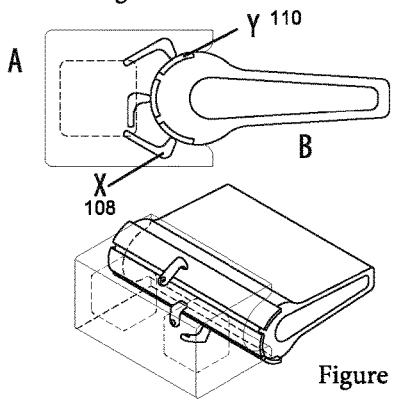
Figure 39
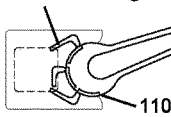
Figure 40
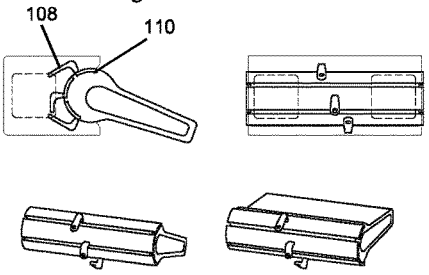
Figure 41   Figure 42
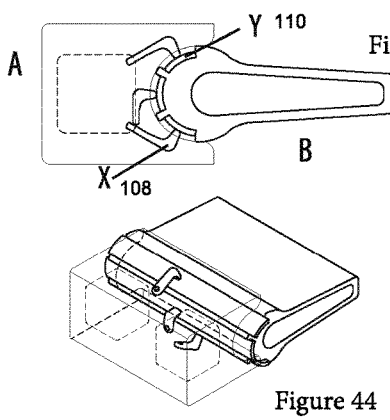
Figure 43
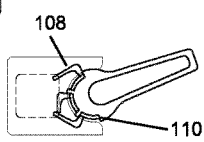
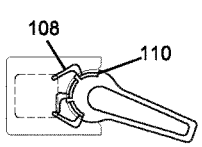
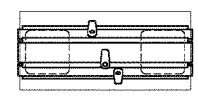
Figure 44   Figure 45   Figure 46
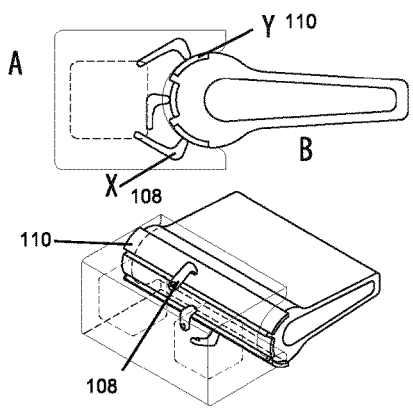
Figure 47
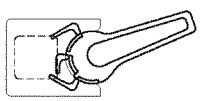
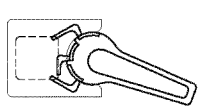
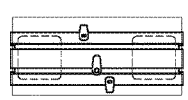
Figure 48

Figure 49
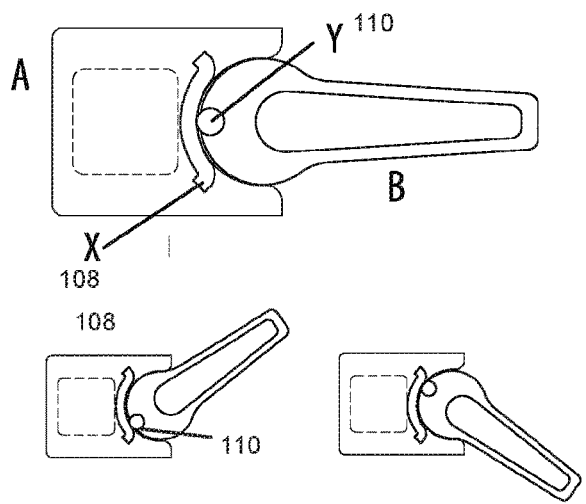
Figure 50
Figure 51
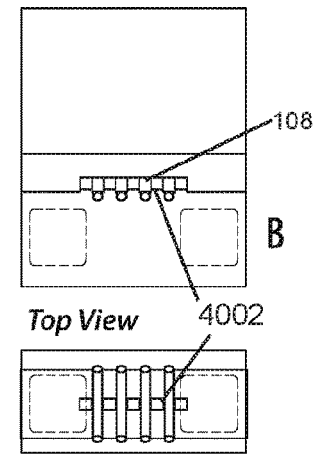
Top View
Front View
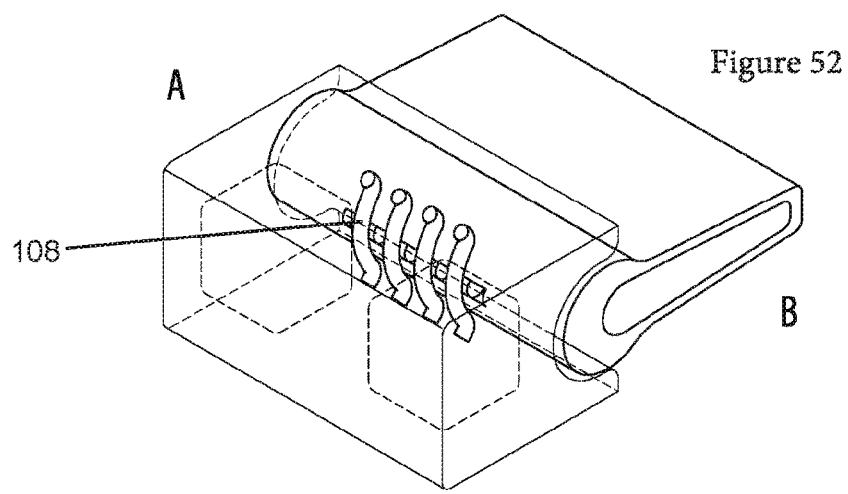
Figure 52

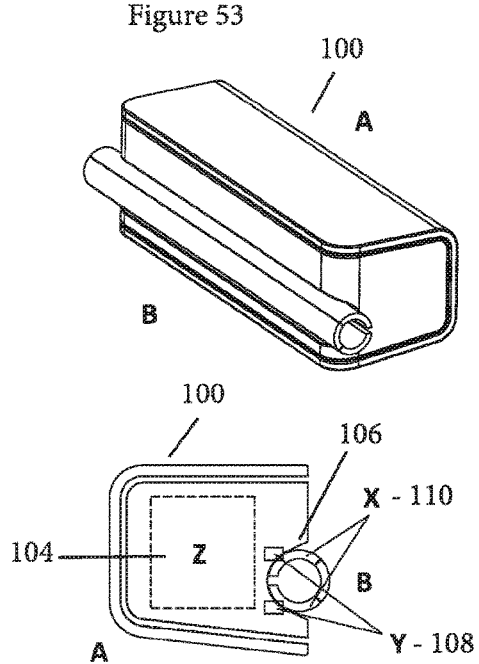
Figure 53
Figure 55
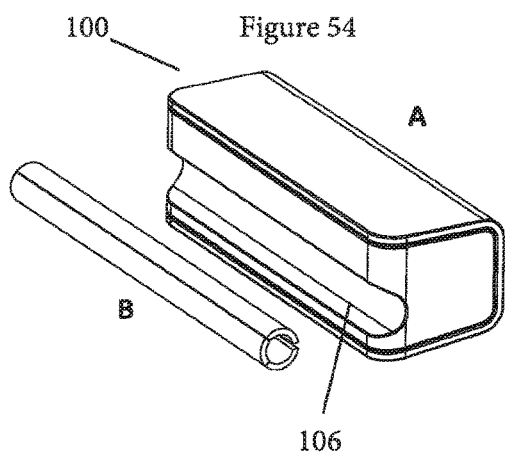
Figure 54

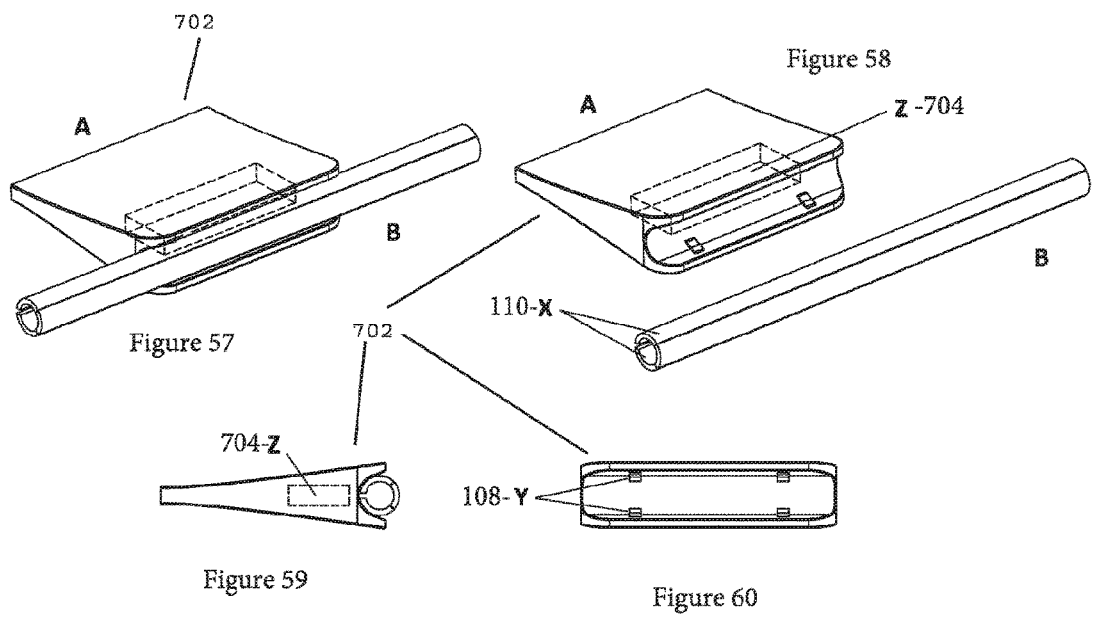

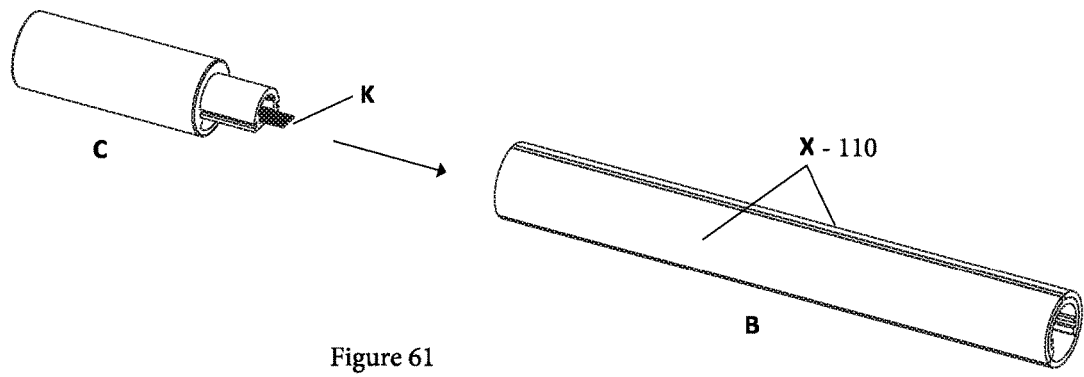
Figure 61
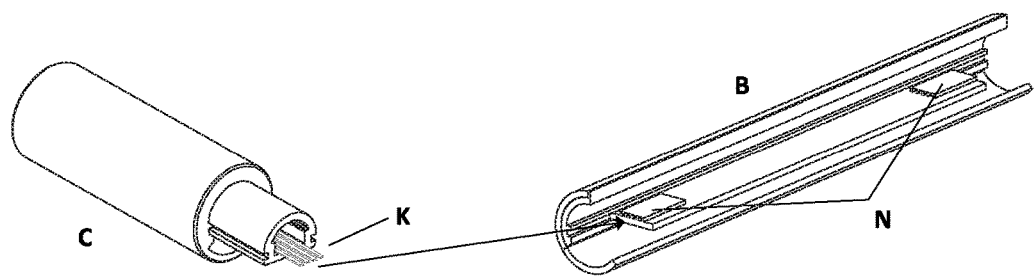
Figure 62
Figure 63

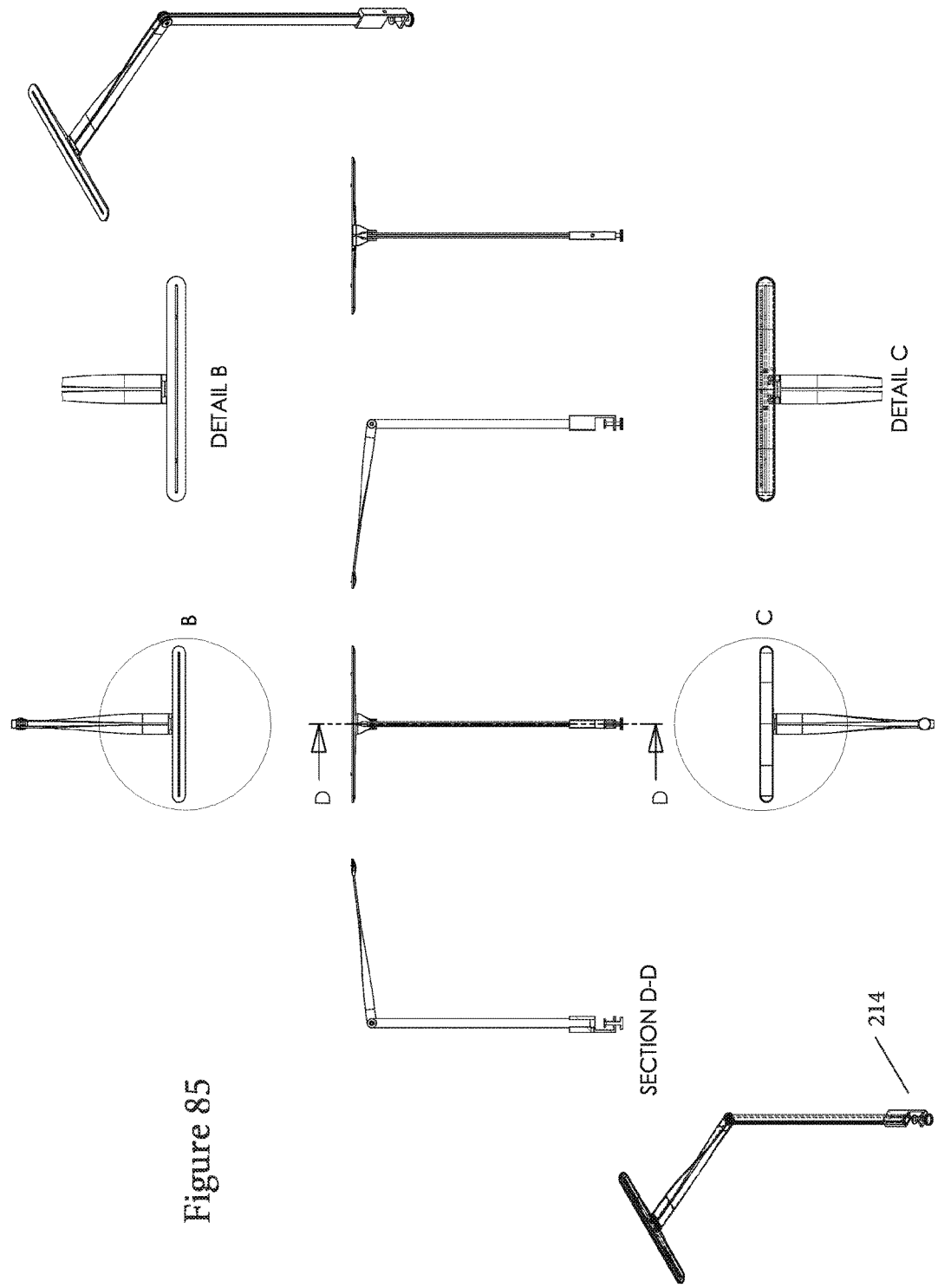

MODULAR ELECTRICAL POWER SUPPLY AND CONTROL SYSTEM

FIELD OF THE INVENTION

The present invention is directed to a modular electrical power supply system which allows the system to easily be installed. In particular, the present invention utilizes magnetic connections to provide power and to connect functional device modules to the electrical contact.

BACKGROUND

Current electrical power supply systems are often difficult to install and are non-extendible. For example, installation of a typical power outlet only provides a limited number of ports and often requires construction to access the interior of the wall to access the electrical wiring. Further, such electrical power outlets are not extendible without more construction or without using bulky and unsightly power extension cords.

Modular electrical systems, such as track lighting systems, allow electricity to be provided along an interior track. However, these electrical modular systems often require expensive installation and are difficult to modify on once installed. Further, track lighting systems only allow one degree of freedom of placement and movement (i.e., along the track) and the system is not designed to be used with other functional modules, such as extenders or wireless devices. It is an aim of the present invention to address the drawbacks of typical electrical and modular power supply systems.

SUMMARY

The modular power electrical system provides a plurality of base modules, connectors, and functional device modules, and mating modules which can be connected together to provide a fully reconfigurable power transfer system. A magnetic connection is used to connect the devices together and to transmit power in some embodiments. Methods for controlling the modules are also described.

BRIEF DESCRIPTION OF THE DRAWINGS

FIGS. 2-3 depict an embodiment in which the electrical connection is provided through ferrous plates.

FIGS. 4-5 depict an embodiment where the electrical supply, connector, and functional device module are separate components.

FIGS. 6-9 depict an alternate embodiment of FIGS. 4-5.

FIGS. 10-11 depict an embodiment in which a magnet is incorporated into a functional device module.

FIG. 12 depicts a first embodiment of a base module and an associated functional device module in accordance the present invention.

FIG. 13 depicts a perspective view of the functional device module after insertion in to the electrical contact.

FIG. 14 depicts a side cross-sectional view of the functional device module and the electrical contact of FIG. 13.

FIGS. 21-23 show detail of how the functional device module maintains electrical contact with the base module as the functional device module is slid longitudinally with respect to the base module.

FIGS. 24 and 25 depict an alternate embodiment of the base module and the functional device module.

FIG. 26 depicts a cutaway view showing the alignment of the electrical contacts on the base module of FIGS. 24 and 25.

FIGS. 27 and 28 show detail of how the functional device module of FIGS. 24 and 25 maintains electrical contact with the base module as the functional device module is rotated.

FIGS. 29 and 30 depict an alternate embodiment of the base module and functional device module.

FIG. 31 depicts a cutaway view showing the alignment of the electrical contacts on the base module of FIGS. 29 and 30.

FIGS. 32 and 33 show detail of how the functional device module of FIGS. 29 and 30 maintains electrical contact with the base module as the functional device module is rotated.

FIGS. 34 and 35 depict an alternate embodiment of the base module and functional device module.

FIG. 36 depicts a cutaway view showing the alignment of the electrical contacts on base module of FIGS. 34 and 35.

FIGS. 37 and 38 show detail of how the functional device module of FIGS. 34 and 35 maintains electrical contact with the base module as the functional device module is rotated.

FIGS. 39 and 40 depict an alternate embodiment of the base module and functional device module.

FIGS. 41 and 42 show detail of how the functional device module of FIGS. 39 and 40 maintains electrical contact with the base module as the functional device module is rotated.

FIGS. 43 and 44 depict an alternate embodiment of the base module and functional device module.

FIGS. 45 and 46 show detail of how the functional device module of FIGS. 43 and 44 maintains electrical contact with the base module as the functional device module is rotated.

FIGS. 47 and 48 depict a hybrid of the embodiments depicted in FIGS. 39-42 and 43-35.

FIGS. 49-52 depict an embodiment of the base module and functional device module suitable for high bandwidth applications.

FIGS. 53-55 depict an alternate embodiment of both the base module and the functional device module.

FIGS. 57-60 depict an alternate embodiment of a base module having a different shape.

FIGS. 61-63 depict an embodiment showing a functional device module adapted to accommodate mating modules.

FIG. 85 depicts various other views of the task light of FIG. 81.

DETAILED DESCRIPTION

Figure 1:
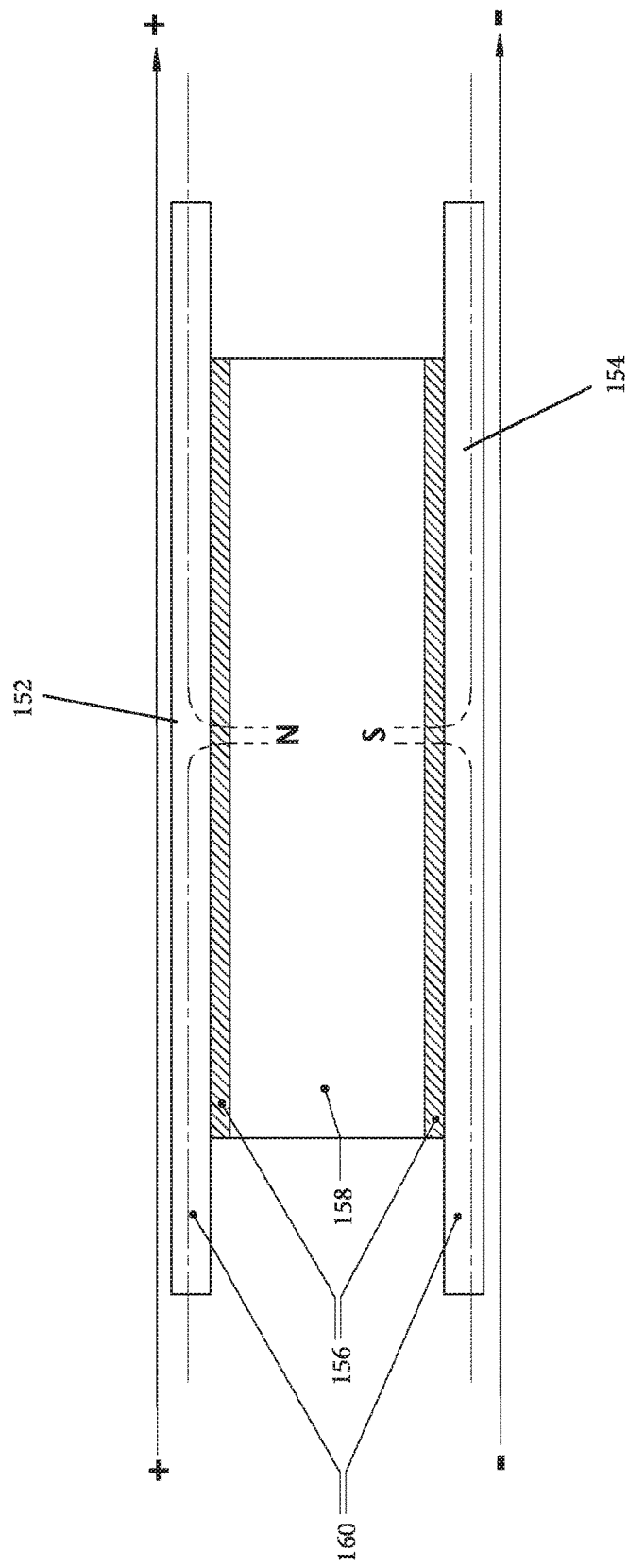
FIG. 1 depicts an enhanced view showing how two ferrous plates can be used to provide an electrical and a magnetic connection.

Referring first to FIG. 1, depicted is a view of how upper conductive surface 152 and lower conductive surface 154 can be used for providing a magnetic connection to attach a functional device module B (shown later) and simultaneously supply power to the functional device module. By using insulating material 156 to isolate the magnet 158, the separate polarities of power supply 160 can still be conducted while upper conductive surface 152 and lower conductive surface 154 are magnetized. Suitable insulation materials include PVC, glass, rigid laminates, varnishes, resin, paper, and non-stick coatings. The magnet 158, insulating material 156, upper conductive surface 152, and lower conductive surface 154 can be joined together using any known methods such as adhesives, melting, welding, etc. Various implementations of this assembly will be described with respect to FIGS. 2-11.

FIGS. 2 and 3 depict an embodiment of base module A. The power supply 160 in this embodiment is formed from two separate conductive strips which provide different voltages to upper conductive surface 152 and lower conductive surface 154. Upper conductive surface 152 and lower conductive surface 154 are preferably identical in size, shape, and material composition, although any ferrous conductive material is suitable. A magnet 158 is located at a center of base module A and is electrically isolated from upper conductive surface 152 and lower conductive surface 154 by a pair of insulating sheets 156. In this embodiment, the conductive surfaces 152 and 154 extend beyond an end of the magnet 158 to form a channel 160 as depicted in FIG. 3.

Because upper conductive surface 152 and lower conductive surface 154 are made of a ferrous material, they are magnetized by magnet 158 and cause functional device module B to be magnetically connected to base module A along channel 160. The magnet 158 itself also exerts a strong force on contacts 110 of functional device module B. This embodiment allows the functional device module B to be rotated and slid within channel 162.

The base module A of FIGS. 2-3 can be used without coating or covering upper conductive surface or lower conductive surface 154 when DC voltage is applied, leading to lower production costs. The base module A of FIGS. 2-3 is especially suited for low voltage applications because there is little risk in a user being electrocuted.

An embodiment based on FIGS. 2-3 is depicted in FIGS. 4-5. This system comprises electrical supply 170, connector 172, and functional device module B. The majority of electrical supply 170 is preferably formed from an electrical insulator 174 and is covered with two or more conductive surfaces 176, preferably made from a material similar to upper conductive surface 152 and lower conductive surface 154. The exterior surface of electrical supply 170 may be any shape. A circular shape allows rotation of the connector 172 about electrical supply 170 whereas a rectangular or octagonal shape would prevent rotation of connector 172. The shape of the exterior surface is chosen based upon the desired functionality. For example, in a medical setting, it may not be desirable to have rotation of a lighting module.

Connector 172 comprises magnet 158 at its center, insulating sheets 156 to magnetically isolate the magnet 158, upper conductive surface 152, lower conductive surface 154, and housing 178. Here, upper conductive surface 152 and lower conductive surface 154 are widened to form channel 180. The housing 178 forms an outer surface of the connector 172, with only the ends of channel 180 and the opposite ends of upper conductive surface 152 and lower conductive surface 154 extending through the housing 178 to allow for electricity to be transferred from electrical supply 170 to functional device module B as shown in FIG. 5.

The magnet 158 connects connector 172 to both electrical supply 170 and functional device module B. Channels 182 formed in opposing ends of housing 178 allow the connector 172 to be slid/rotated with respect to both electrical supply 170 and functional device module B, allowing for a wide variety of placements and configurations of all the elements.

FIGS. 6 and 7 depict an alternate embodiments of electrical supply 170 and connector 172. For brevity, only the substantial differences will be described. As depicted, the electrical supply 170 in this embodiment is formed by two conductive sheets 184 running parallel to each other. The connector 172 is substantially identical to that of FIG. 72 except that housing 178 has been removed. In this embodiment, connector 172 can only be slid with respect to electrical supply 170 whereas functional device module B can be slid and rotated with respect to connector 172. For clarity, FIGS. 8 and 9 show electrical supply 170, connector 172, and functional device module B before being connected as depicted in FIGS. 6 and 7.

Any of electrical supply 170, connector 172, or functional device module B may incorporate one or more wireless modules for allowing control by an operating device. For example, electrical supply 170 and/or connector 172 may incorporated a wireless module capable of communicating via Bluetooth 5. This allows the power to be controlled wireless to one or more simultaneously connected devices.

FIGS. 10 and 11 depict an embodiment in which a magnet 158 is incorporated into a functional device module B. As shown in FIG. 10, the electrical supply 170 interfaces with assembly 186 which is substantially similar to the assembly shown in FIG. 78 to provide the magnetic and electrical connection to electrical supply 170. A housing 188 forms an exterior of functional device module B, only leaving contacts 190 exposed which provide power to functional device module B after connection to power supply 170.

Referring now to FIG. 12, depicted is a first embodiment of modular electrical power supply system 100 that provides an electrical and mechanical connection between base module A and functional device module B. Base module A generally comprises housing 102, one or more internal magnets 104, concave channel 106, and electrical contacts 108. Electrical contacts 108 may be located anywhere along concave channel 106. Preferably, electrical contacts 108 are located near the center of concave channel 106.

Power is supplied to base module A through power cord or wiring 116. Functional device module B generally comprises one or more conductive contacts 110 integrated into housing 112 along convex protrusion 114 which is shaped to fit into concave channel 106. Preferably, conductive contacts 110 slightly protrude above the surface of housing 112. In some embodiments, functional device module B may also include an internal magnet or magnets if a stronger connection to base module A is required (e.g., if functional device module B is heavy). In the depicted embodiment, conductive contacts 110 are conductive rods that run the entire length of housing 112. As a result, electrical contacts 108 can be relatively thin and located in just a single portion of concave channel 106 as will be described later. Conductive contacts 110 can be any shape including rectangular, triangular, round, hexagonal, etc. or any length.

Base module A may be mounted or placed anywhere an electrical connection is desired or necessary. For example, base module A may be attached to furniture, walls, ceilings, shelves, mechanical fastener or plate, tracks, poles, wire management plates, electrical connector plates, etc. In some instances, base module A may be provided in lieu of or in addition to a power plug.

FIGS. 13 and 14 depict functional device module B after insertion into base module A. As functional device module B is brought close base module A, magnets 104 attract conductive contacts 110, causing functional device module B to be "snapped to" and affixed in concave channel 106. This causes conductive contacts 110 to come into contact with electrical contacts 108, supplying functional device module B with power.

Functional device module B may be any functional item including fans, lights, heaters, speakers, cameras, sensor, motion sensors, etc. that requires power to operate. Accordingly, housing 112 can be of any shape, length, material, or design needed for functional device module B and the electrical components located therein. For example, housing 112 for a speaker may be very different in shape than that of a motion sensor.

Figure 15:
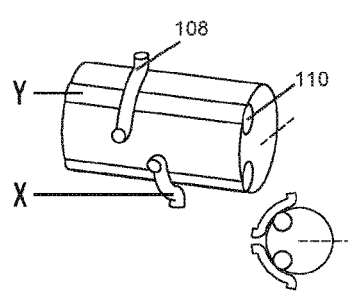
FIGS. 15-17 show detail of how the functional device module maintains electrical contact with the base module as the functional device module is rotated.
Figure 16:
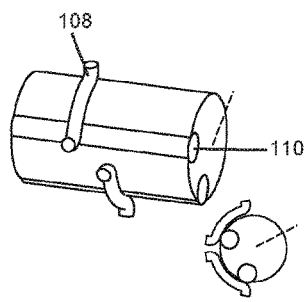
Figure 17:
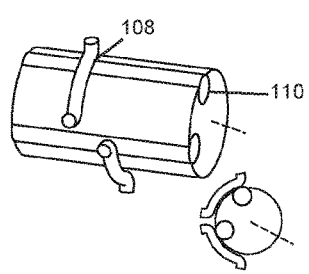
Figure 18:
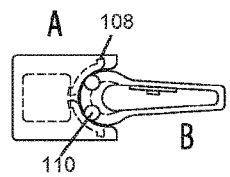
FIGS. 18-20 depict cross-sectional views of the contact between the functional device module and the base module as the functional device module is rotated.
Figure 19:
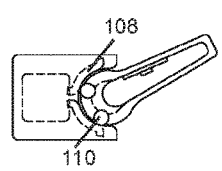
Figure 20:
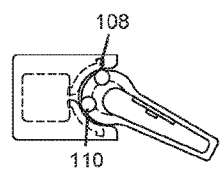

Turning next to FIGS. 15-23, depicted are various views showing how functional device module B maintains electrical contact with the base module A as the functional device module B is rotated within concave channel 106 (e.g., 25-90° upwards or downwards). As previously described, magnets 104 exert a significant force on functional device module B and allow it to be rotated within concave channel 106. A first electrical contact 108 extends partially around concave channel 106 and a second electrical contact 108 extends partially around another section of concave channel 106 as depicted in FIGS. 15-17. In this embodiment, electrical contact 108 are preferably formed from a springy conductive material. As shown, at least one electrical contact 108 is always in connection with at least one conductive contact 110, ensuring that functional device module B is always supplied with power despite its insertion or rotation angle. A cross-sectional view of the contact between electrical contacts 108 and conductive contacts 110 is depicted in FIGS. 18-20. FIG. 19 depicts functional device module B rotated fully upward and FIG. 20 shows functional device module B rotated fully downward. As shown, the upper electrical contact 108 is always in connection with the upper conductive contact 110 and the lower electrical contact 108 is always in connection with the lower conductive contact 110 at any angle of rotation. The shape of concave channel 106 and convex protrusion 114 prevents over rotation of functional device module B so that upper conductive contact 110 does not come into contact with lower electrical contact 108.

The upper electrical contact 108 preferably supplies a positive DC voltage and the lower electrical contact 108 is a ground or vice versa. Base module A includes a safety circuit that cuts power if the two or more electrical contact 108 are joined inadvertently to complete a circuit (e.g., by a user's hand or by a piece of metal). In a similar manner, functional device module B may also comprise a safety circuit that cuts power if an electrical connection is made between the conductive contacts 110. Such safety features are generally only needed if convex portion 114 is longer lengthwise than concave channel 106.

If AC current is being utilized by functional device module B, the upper electrical contact 108 can supply the first alternating current while the lower electrical contact 108 can supply the opposing alternating current. The functional device module B may also comprise an AC/DC converter for converting the supplied AC signal to a DC signal.

Further, as depicted in FIGS. 21-23, the positioning of electrical contact 108 and conductive contacts 110 allows functional device module B to be centered (FIG. 21), slid right (FIG. 22), or slid left (FIG. 23) while still maintaining electrical contact with electrical contacts 108.

FIGS. 24 and 25 depict an alternate embodiment of base module A and functional device module B in which base module A has three electrical contacts 108 and functional device module B has three conductive contacts 110. As depicted, the three conductive contacts 110 are equally distributed about convex protrusion 114. A first electrical contact 108 is located at the center of convex channel 106 whereas the other two electrical contacts 108 are equally spaced to the left and right as depicted in FIG. 26. FIGS. 27 and 28 depict how electrical contacts 108 maintain contact only with their corresponding conductive contacts 110 as functional device module B is rotated. A first electrical contact 108 can be used to supply a positive DC voltage, a second electrical contact 108 can be used to supply a ground, and a third electrical contact 108 can be used to for a data connection between base module A and functional device module B. For example, base module A may include a PCB or other device that can communicate information to a PCB of functional device module B.

FIGS. 29 and 30 depict an alternate embodiment of base module A and functional device module B in which base module A has four electrical contacts 108 and functional device module B has four conductive contacts 110. As depicted, the four conductive contacts 110 are equally distributed about convex protrusion 114. Two electrical contacts 108 are positioned just left of the center of convex channel 106 whereas the other two electrical contacts 108 are positioned equally just right of the center of convex channel 106 as depicted in FIG. 31. FIGS. 32 and 33 depict how electrical contacts 108 maintain contact with conductive contacts 110 as functional device module B is rotated.

FIGS. 34 and 35 depict an alternate embodiment of base module A and functional device module B in which base module A has five electrical contacts 108 and functional device module B has five conductive contacts 110. As depicted, the five conductive contacts 110 are equally distributed about convex protrusion 114. A first electrical contact 108 is located at the center of convex channel 106 whereas the other four electrical contacts 108 are equally spaced to the left and right as depicted in FIG. 36. FIGS. 37 and 38 depict how electrical contacts 108 maintain contact with conductive contacts 110 as functional device module B is rotated.

Based on the foregoing, it should be apparent that any combination of base module A and functional device module B depicted in FIGS. 24-38 can be combined. Base module A does not need to have the same number of electrical contacts 108 as the number of conductive contacts 110 on functional device module B as long as electrical contact is maintained during rotation and longitudinal movement of functional device module B.

FIGS. 39 and 40 depict an alternate embodiment of functional device module B in which the conductive contacts 110 are flush with the surface. In this embodiment, the conductive contacts 110 are long, thin strips of conductive metal extending the length of functional device module B which are flush with housing 112. Also, in this embodiment, the electrical contacts 108 are L-shaped springy conductive elements which maintain contact with conductive contacts 110 as it is rotated (FIGS. 41 and 42).

FIGS. 43 and 44 depict an alternate embodiment of functional device module B in which the conductive contacts 110 are recessed. In this embodiment, the conductive contacts 110 are long, thin strips of conductive metal extending the length of functional device module B which are recessed in concave protrusion 114. Because the electrical contacts 108 are L-shaped springy conductive elements which extend into the recesses formed in concave protrusion 114, the rotation of functional device module B can be limited (by limiting a thickness of the recess) as shown in FIGS. 45 and 46.

FIGS. 47 and 48 depict a hybrid of the embodiments depicted in FIGS. 39-42 and 43-46. As depicted, two conductive contacts 110 are flush with concave protrusion 114 while a center conductive contact 110 is recessed from the surface of concave protrusion 114.

FIGS. 49-52 depict an embodiment of base module A and functional device module B suitable for high bandwidth applications and/or for AC power. In this embodiment, functional device module B includes a plurality (e.g., four) conductive contacts 110 separated by dividers 4002. Base module A comprises an equal number of electrical contacts 108 as depicted in FIG. 52. Dividers 4002 prevent functional device module B from sliding longitudinally within concave channel 106. Each conductive contact 110 supplies a different input to functional device module B (e.g., two conductive contacts 110 may be used to supply AC power while two other conductive contacts 110 may be used for data transfer). Dividers 4002 ensure that the correct conductive contact 110 will be aligned with the correct electrical contact 108 which is important in high bandwidth applications where data may also be communicated from functional device module B to base module A and vice versa.

Referring next to FIGS. 53-55, depicted is an alternate embodiment of base module A and functional device module B similar to that depicted in FIGS. 12-52. Here, base module A is generally rectangular, similar to that of base module A depicted in FIGS. 12-15. However, electrical contacts 108, in this embodiment, are one or more thin strips of conductive material which extend the entire length of concave channel 102. This configuration allows power to be supplied to one or more functional device modules B concurrently placed within concave channel 106. As previously discussed, the functional device modules B can have any form factor as long as they contain a convex protrusion 114 which can fit within concave channel 106 as depicted in FIGS. 53-55.

The outer surface of functional device module B is covered by two electrical contacts 110 which are connected to electrical contacts 108. The two electrical contacts 110 are preferably separated by a narrow gap or other material to allow +/− or a ground to be supplied from electrical contacts 110. The two electrical contacts 110 are preferably metallic and magnetic surfaces which are attracted to magnet 104 and conduct electricity.

The modular electrical power system 100, in this embodiment, preferably operates at a low voltage which allows a user to add/remove functional device module B by hand. A magnet 104, located within base module 102, holds the functional device modules B within the channel while still allowing it to easily be removed. In some embodiments, the functional device module B may also comprise internal magnets to strengthen the connection.

Figure 56:
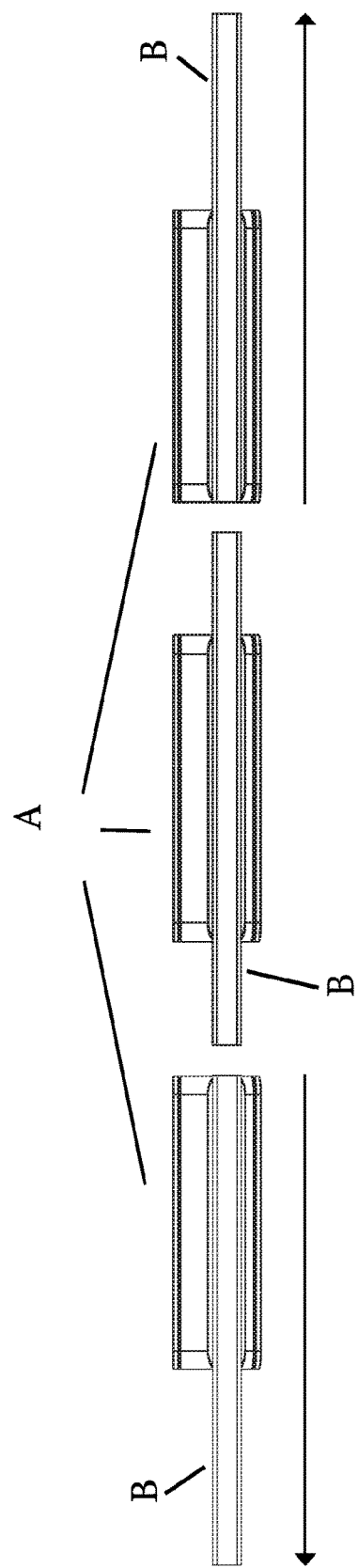
FIG. 56 depicts how the sliding degree of freedom of the base module and the functional device module depicted in FIGS. 53-55.

FIG. 56 depicts the longitudinal movement between functional device module B and base module A. As shown, the modular electrical power supply system allow not only for the rotation of functional device module B, but also for the longitudinal movement of functional device module B within the channel 106 of base module 102 while still maintaining electrical contact between electrical surfaces 110 and electrical contacts 108.

A different shaped base module 702 is depicted in FIGS. 57-60. In this embodiment, the base module 702 has a narrower, elongated profile and is especially useful when functional device module B is task lighting as it allows functional device module B to be further from a mounting surface, such as a wall. Base module 702 is similar to base module 702 in that it incorporates an internal magnet 704 and has a channel 706 to receive functional device module B. Thus, the same functional device module B can be utilized with all of the different shaped base models and connectors described herein.

A system for extending the modular electrical contact system to accommodate various wireless or other modules is depicted in FIGS. 61-63. As shown, functional device module B is similar to that shown in FIGS. 53-55 in that it has electrical surfaces 108 which connect to base module A. However, in this embodiment, functional device module B further comprises internal contacts N (on one or both ends) located inside a connection channel. A mating module C has a plurality of mating contacts K which mate with contacts N when mating module C is inserted into functional device module B as depicted in FIG. 61. Functional device module B provides power to mating module C while mating module C allows functional device module B to be wirelessly controlled (Bluetooth, Wifi, Zabbee, etc.). For example, mating module C preferably includes an internal wireless module which is able to control the functionality of functional device module B through a wireless connection (through the mating of contacts K with contacts N). Mating modules B may also be used to provide other additional functionality to functional device module B such as a speaker, additional lighting, etc.

In some embodiments, the functionality mating module C may be incorporated into functional device module B. For example, functional device module B may comprise an wireless module capable of communicating via a standard wireless protocol, such a Bluetooth 5. Bluetooth 5, allows a single device, such as a cell phone or computer, to be wirelessly connected to multiple devices at the same time.

Figure 64:
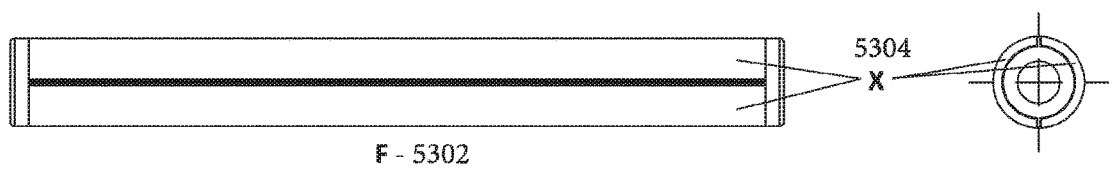
FIG. 64 depicts an embodiment of an electrical connection module.
Figure 65:
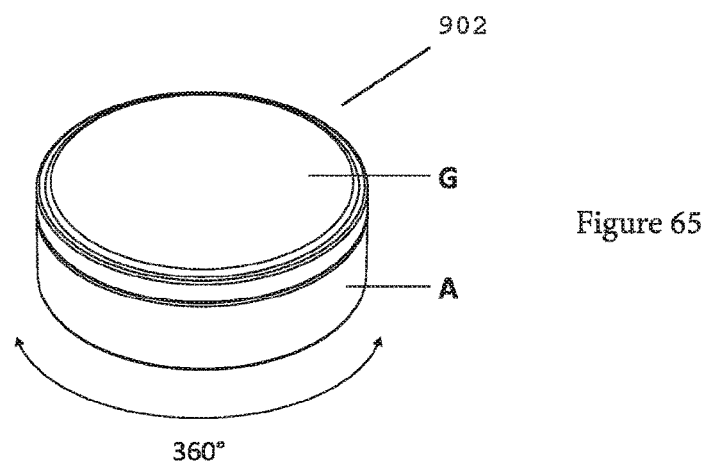
FIGS. 65-69 depict an embodiment of a rotating base.
Figure 66:
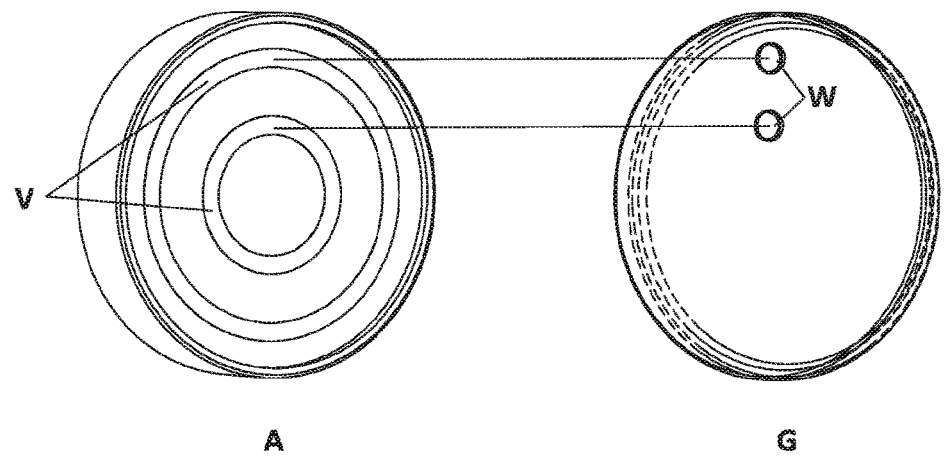

FIG. 64 depicts an electrical connection modules 5302 in the form of a post. The outer surface of electrical connection module 5302 is substantially covered by a pair of contacts 5304 which run the length of the post. A thin insulating material separates the contacts 5304 to allow for power delivery. The various connectors that will be described can be attached to the electrical connection module 5302 along its length and functional device modules B can be attached to the connectors, thus providing a highly modular system. The connectors described herein can also be used to connected a first electrical connection nodule 5302 to a second one, A further embodiment of base module A is depicted in FIGS. 65 and 66, referred to herein as rotating base 902. As depicted, the rotating base 902 is composed of a base G, which may be attached to furniture and supplied electrical power through a cord, and a rotating element A which can rotate 360° relative to base G. The interior of rotating element A preferably has two or more circular electrical contacts V which mate with electrical contacts W on base G. The arrangement of electrical contacts V and W allows rotating element A to be provided with power from base G as it is rotated. Rotating element A and base G may utilize any known methods for providing smooth rotation such as a ball bearing connection or a tongue/groove connection. Further, rotating element A and base G may be held together by a magnetic connection or any other known locking mechanism to prevent their separation.

Figure 67:
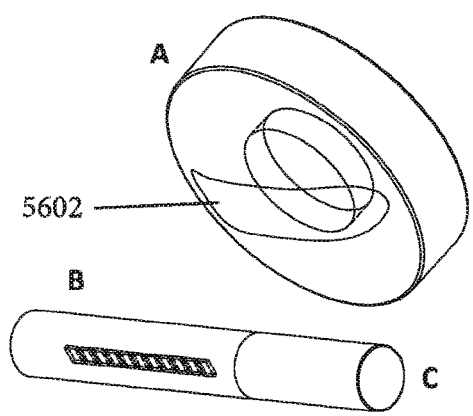
Figure 68:
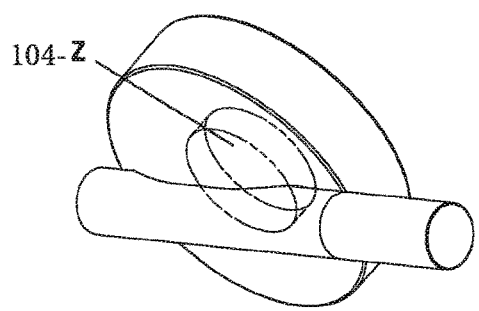
Figure 69:
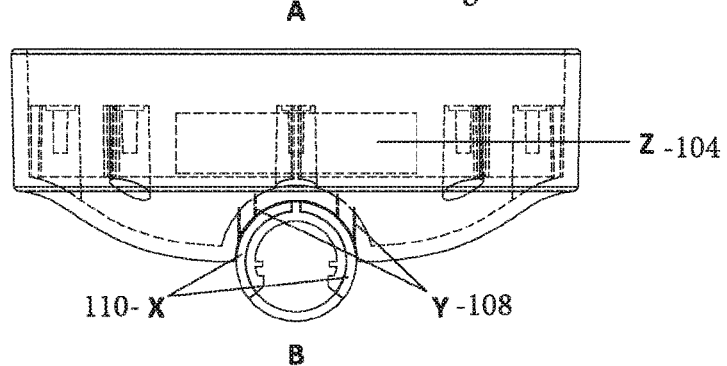
Figures 70, 71:
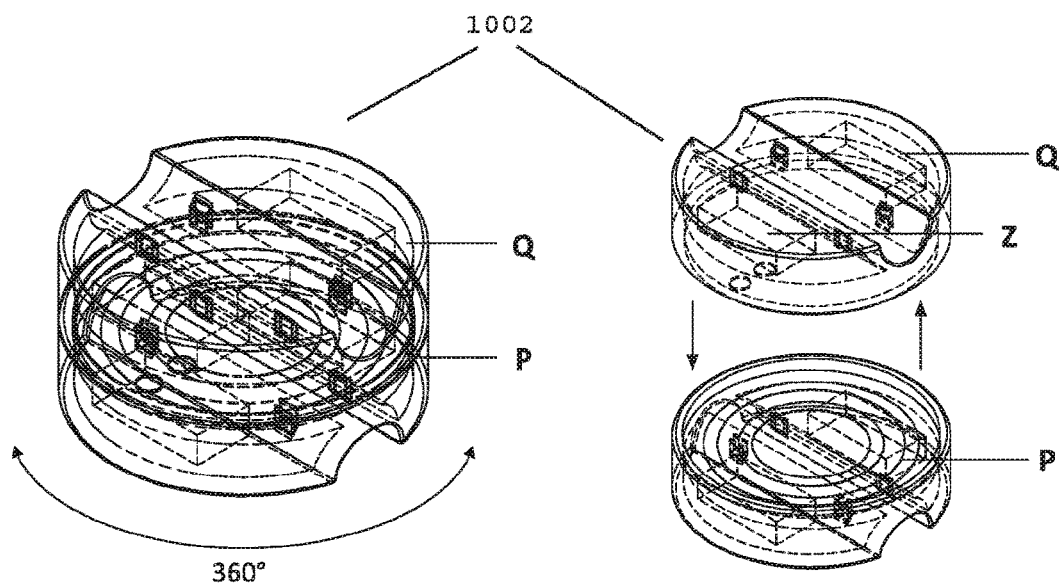
FIGS. 70-74 depict an embodiment of a disc joint connector.

Preferably, the surface of rotating element A comprises a channel to provide electrical power to a functional device module B as depicted in FIGS. 67-69. As shown in FIG. 67, rotating element A comprises channel 5602 sized to mate with one or more functional device modules B or mating modules C as shown in FIG. 68. As in other embodiments, the mechanical connection between rotating element A and functional device module B is accomplished using magnet 104. Channel 106 comprises one or more contacts 108 which provide electrical power to contacts 110 as depicted in FIG. 69. Thus, a combination of rotating base 902 of FIGS. 65-66 with the rotating element A of FIGS. 67-69 allows for transfer of power from base G, through rotating element A, to functional device module B and/or mating module C, all while allowing rotating element A to rotate with respect to base G.

Figures 72, 73:
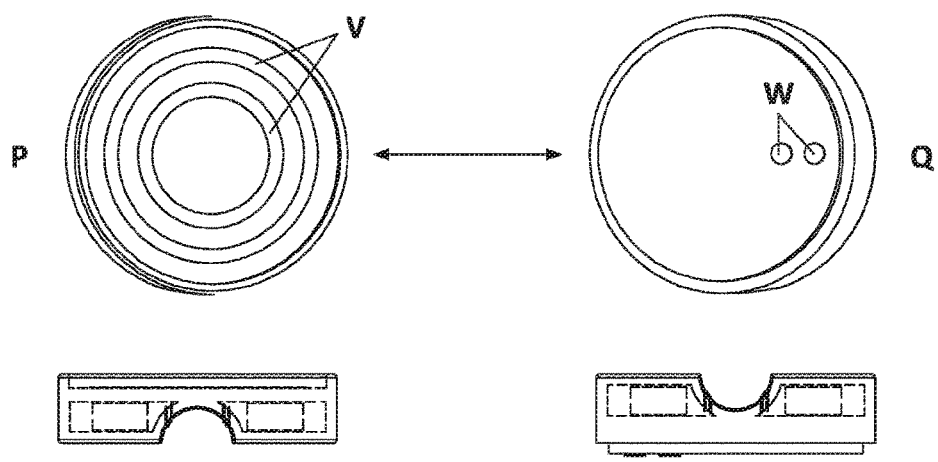
Figure 74:
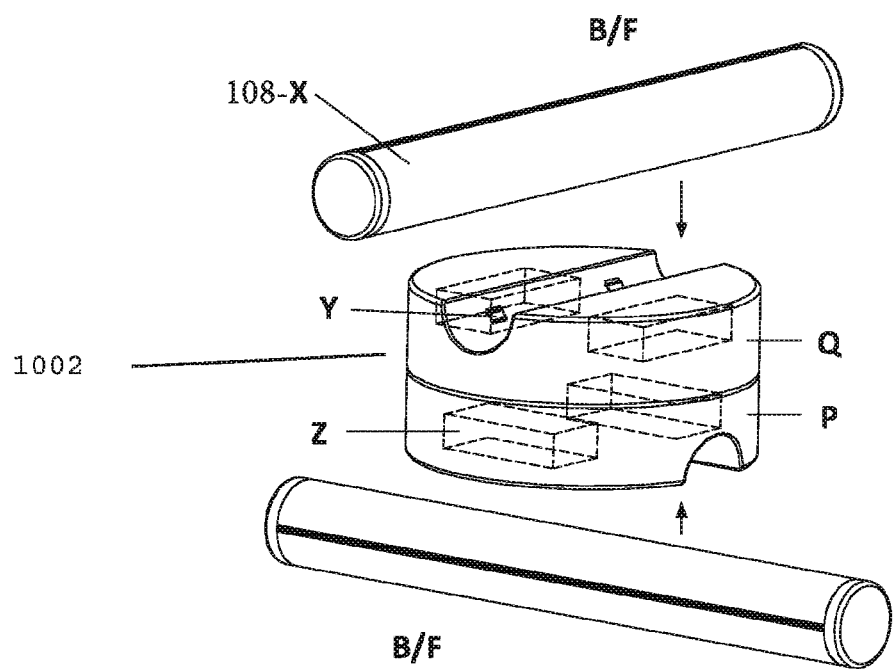

In another embodiment, both rotating element A and base G are provided with a concave channel as depicted in FIGS. 70-73, forming a disc joint 1002, and allowing one functional device module B to be connected to and rotatable to another functional device module B as depicted in FIG. 74. As shown in FIGS. 72 and 73, a first half P of disc joint 1002 contains at least two circular contacts V and a second half Q of disc joint 1002 contains at least two contacts W which mate with electrical contacts V (similar to the contacts shown in FIG. 66 for rotating base 902). The architecture of disc joint 1002 allows power to be passed through from a first connected functional device module B to a second functional device module B while allowing for their rotational freedom with respect to each other.

Figure 75:
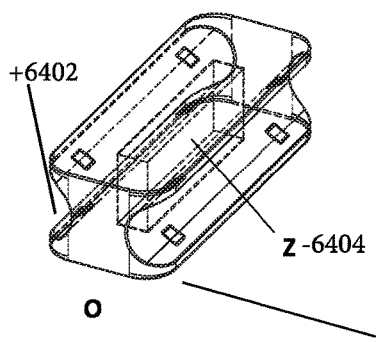
FIGS. 75-77 depict an embodiment of a two-sided connector.
Figure 76:
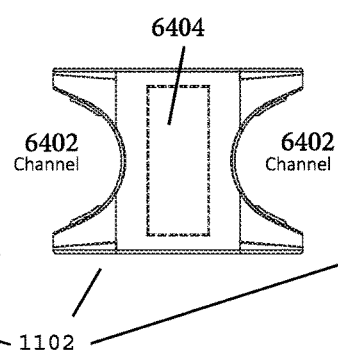
Figure 77:
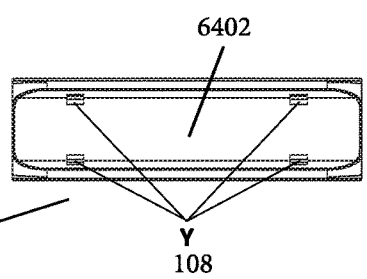

A further type of connector, two sided connector 1102 (FIGS. 75-77), is provided with two opposing channels 6402 and a central magnet 6404. Two sided connector 1102 can either function as a base module, similar to base module 102, to provide power to two or more separate functional device modules B simultaneously. Alternatively, two sided connector 1102 may be used to pass power from a first functional device module B to a second device module B as described with reference to disc joint 1002.

Figure 78:
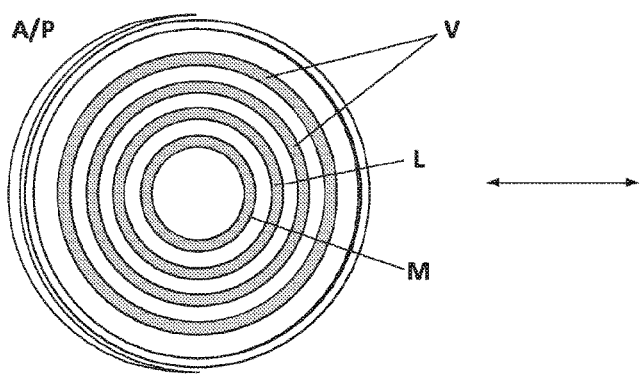
FIG. 78-79 depict an alternate embodiment of the interior of a rotating base or a disc joint connector.
Figure 79:
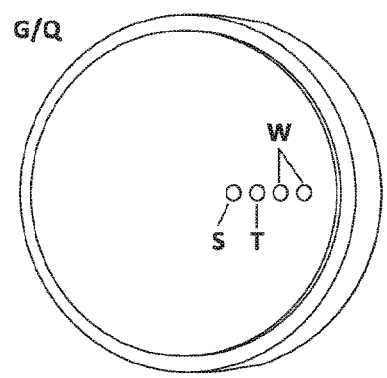

Base G in rotating base 902 or disc joint 1002 may also be provided with additional electrical contacts S and T which mate with electrical contacts L and M to allow for data or other necessary connections as depicted in FIGS. 78 and 79.

Figure 80:
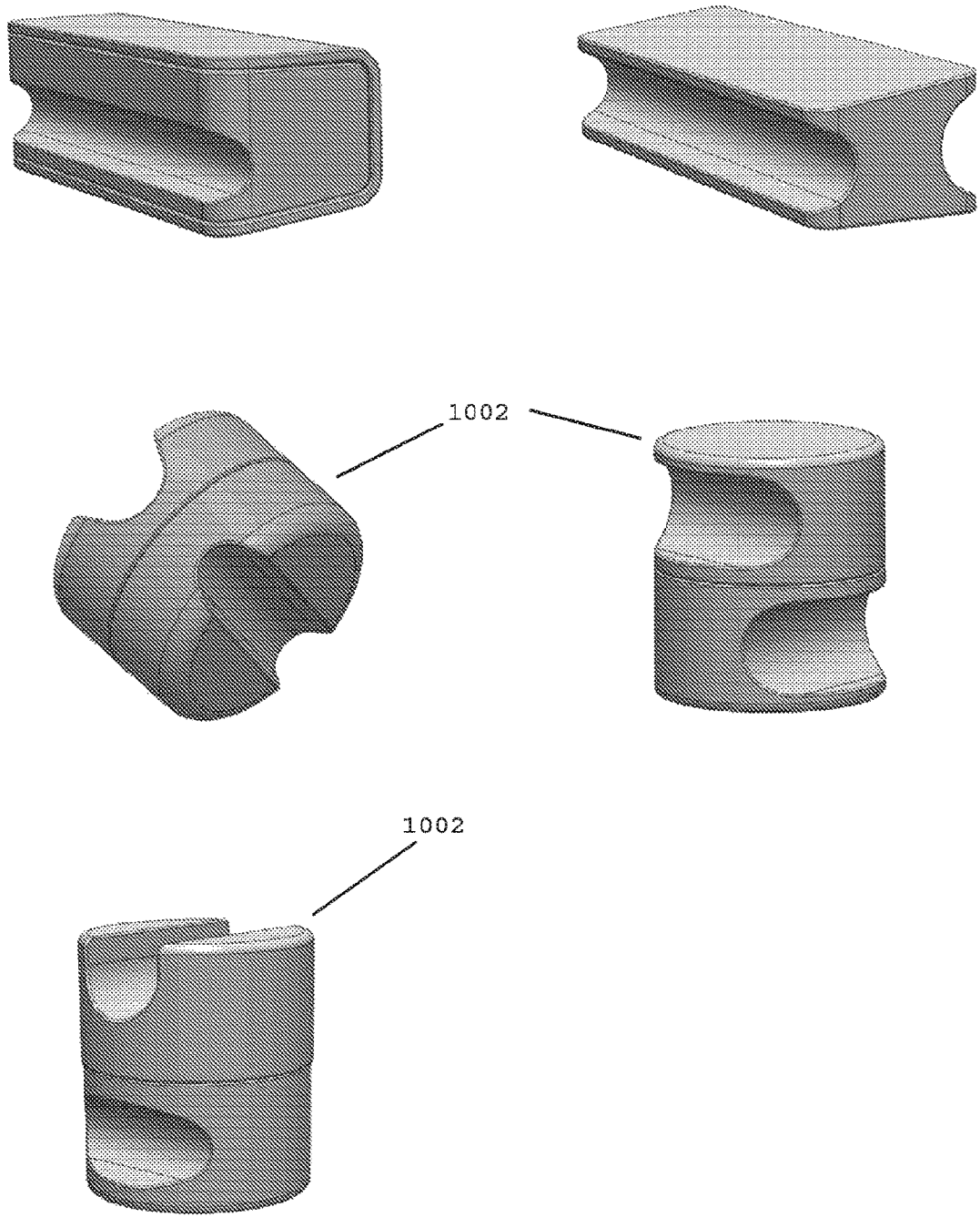
FIG. 80 depicts alternate embodiments of a disc joint connector.

FIG. 80 depicts additional placement options for the channels of disc joint 1002. For example, one or both channels can be moved to the side of the housing instead of being on the top of the housing. Because the electrical connection is passed from device to device (e.g., base to module to connector), only one electrical source is needed to provide power to the modular electrical contact system of the present invention.

Ambient task lighting and module control

Figure 81:
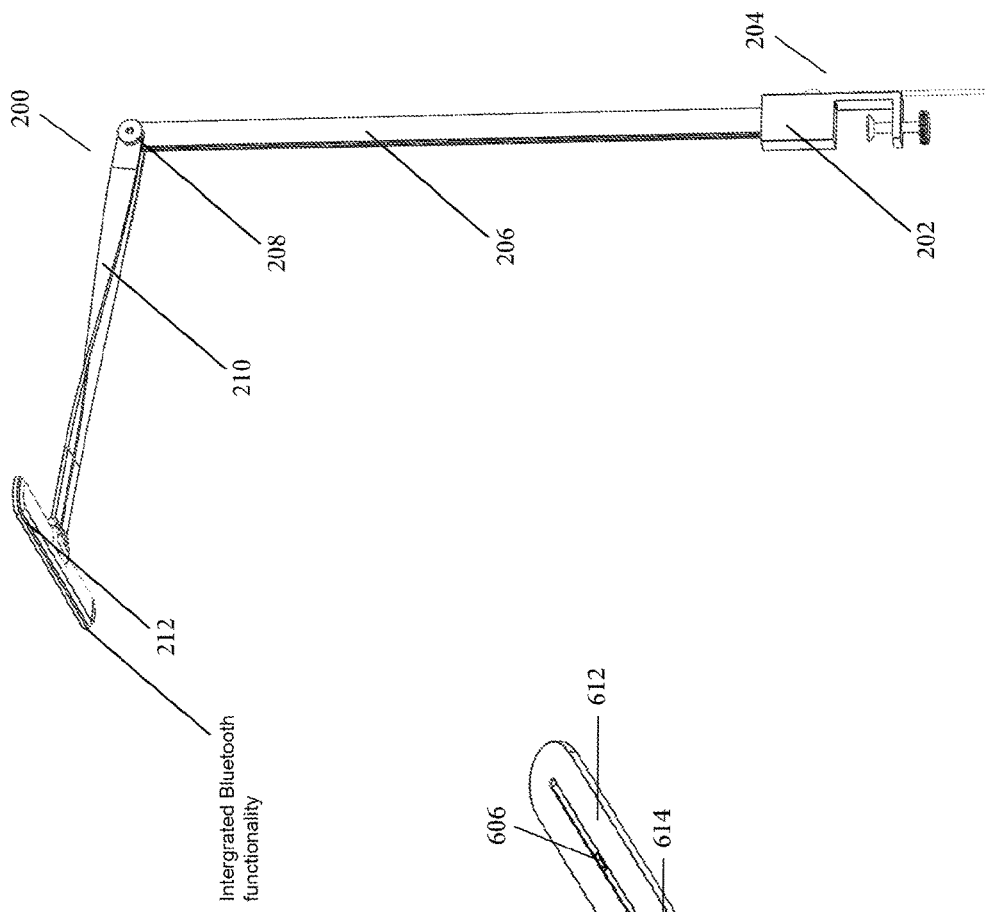
FIG. 81 depicts a perspective view of the task light of the present invention according to a first embodiment.
Figure 83:
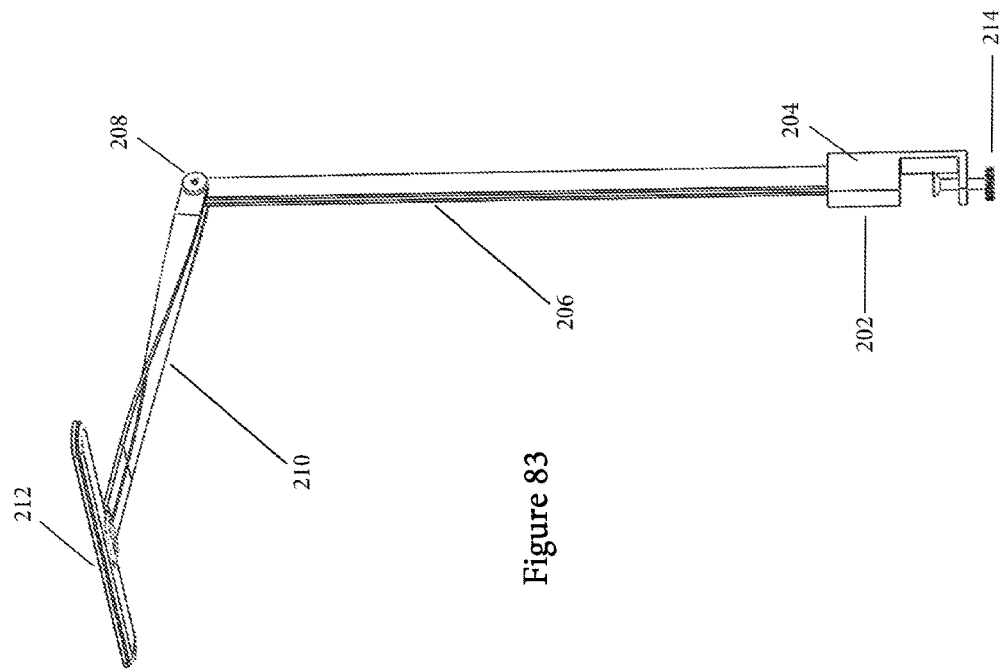
FIG. 83 depicts a third perspective view of the task light of FIG. 81.

FIG. 81 depicts a perspective view of task light 200. As shown, task light 200 generally comprises base clamp 202, power cord 204, dual vertical arms 206, hollow hinge 208, dual horizontal arms 210, and light 212. Base clamp 202 allows task light 200 to be affixed to a table or other flat surface by adjusting clamp 214 (seen in greater detail in FIGS. 83 and 85). However, it should be obvious to one of ordinary skill in the art that other fixation means may be utilized such as clips or friction fits. In some embodiments, base clamp 202 may be replaced with a conventional weighted base capable of holding task light 200 in an upright position while being adjusted. In alternate embodiments, base clamp may be utilized with base claim A shown in FIGS. 1-80. Base clamp 202 may further comprises an AC/DC converter for converting AC power from power cord 204 (plugged into a standard socket) into DC power to power light 212.

The converted DC power is passed from base clamp 202 to light 212 through dual vertical arms 206, hollow hinge 208, and dual horizontal arms 210 without requiring a wire to be run from base clamp 202 to light 212. It is important that there the two arms in dual vertical arms 206 and dual horizontal 210 remain isolated from each other as one arm carries the positive polarity and the other arm carries the negative polarity or acts as a ground. Similarly, hollow hinge 208 must have two separate components in other to pass the respective polarities without interference.

Hollow hinge 208 allows dual horizontal arms 210 to be moved independently of dual vertical arms 206. In some embodiments, another hinge may also be utilized to connect dual vertical arms 206 to base claim 202 to allow for further movement and adjustment of task light 200. Dual vertical arms 206, hollow hinge 208, and dual horizontal arms 210 can be constructed from any material that allows passage of electricity (i.e., a conductor) from base clamp 202 to light 212. Alternatively, dual vertical arms 206, hollow hinge 208, and dual horizontal arms 210 may be formed from an insulating material, such as plastic, which encases an inner conductor that passes the electricity from base clamp 202 to light 212.

Figure 84:
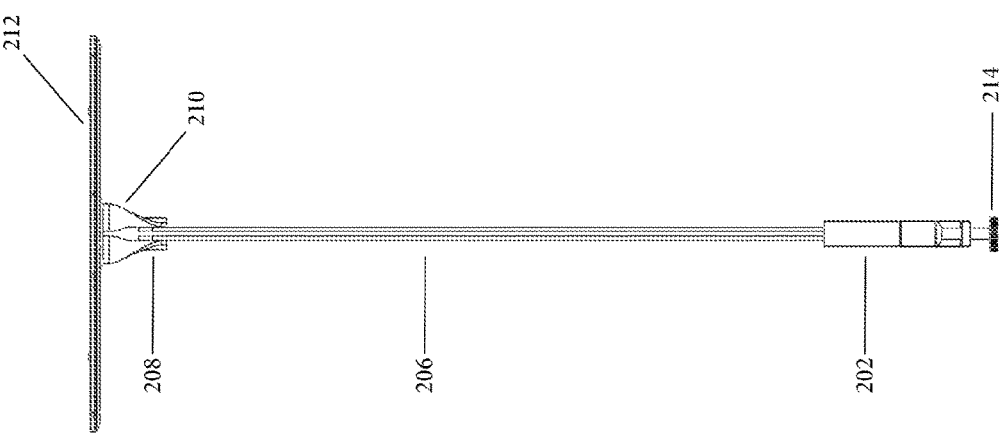
FIG. 84 depicts a front view of the task light of FIG. 81.

The aesthetic appearance of dual vertical arms 206 and dual horizontal arms 210 may be modified in any manner as long as they remain separate. For example, as best depicted in FIGS. 81 and 84, dual vertical arms 206 are formed from two thin parallel rectangular plates extending from base clamp 202 to hinge 208 whereas dual horizontal arms 210 have a slight twist in them which provides aesthetic appeal and extra structural support to light 212.

Because light 212 utilizes LEDs which require low voltage to operate, there is little risk of a person being shocked if they touch dual vertical arms 206, hollow hinge 208, and dual horizontal arms 210. However, dual vertical arms 206, hollow hinge 208, and dual horizontal arms 210 can be coated with a nonconductive powder or other material for further safety.

Figure 86:
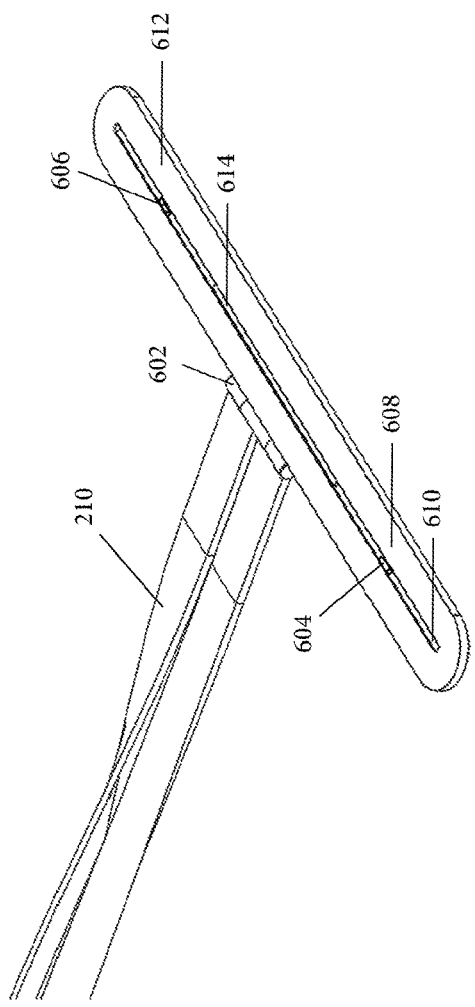
FIG. 86 depicts a perspective view of the light of the task light of FIG. 81.
Figure 82:
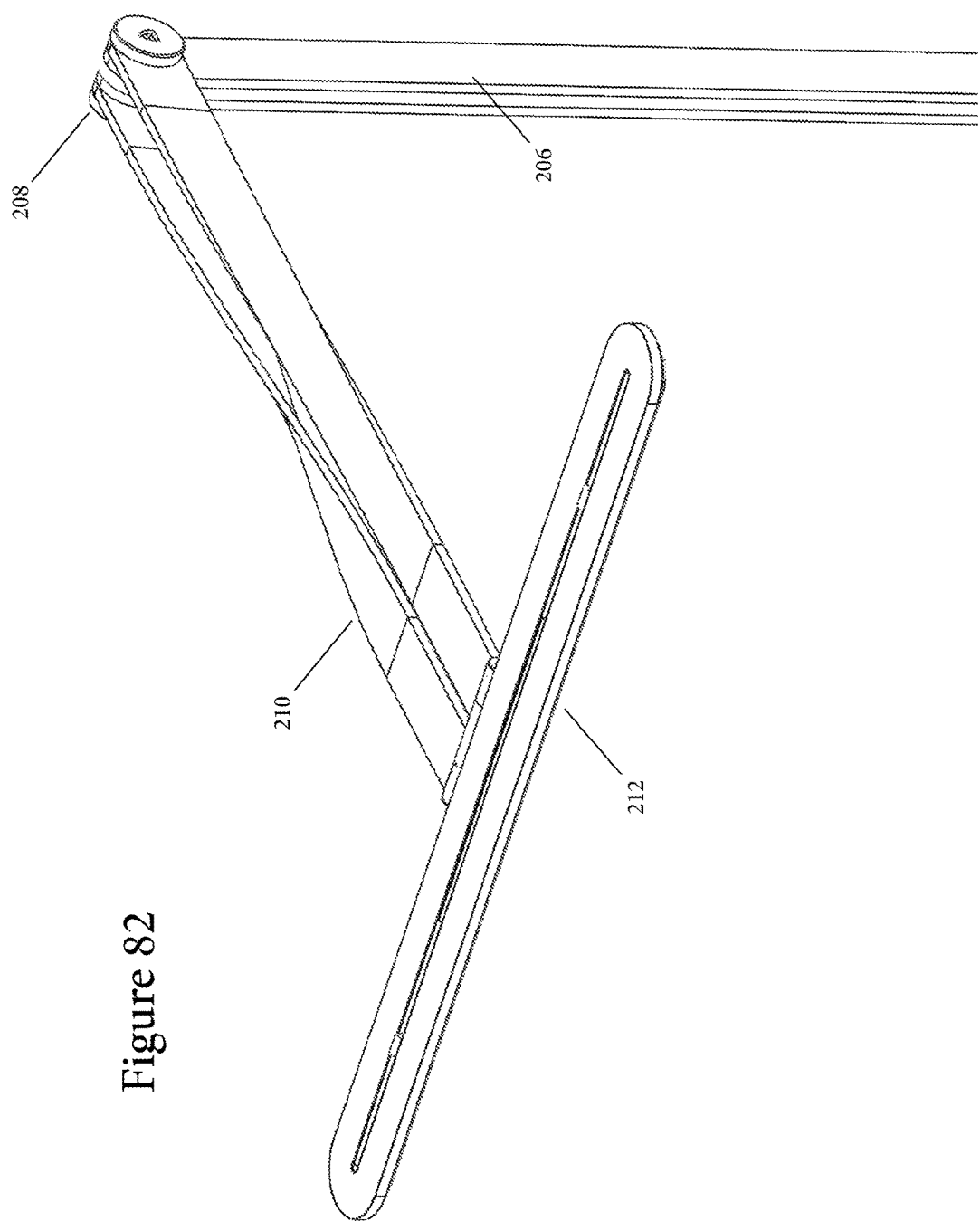
FIG. 82 depicts a second perspective view of the task light of FIG. 81.
Figure 87:
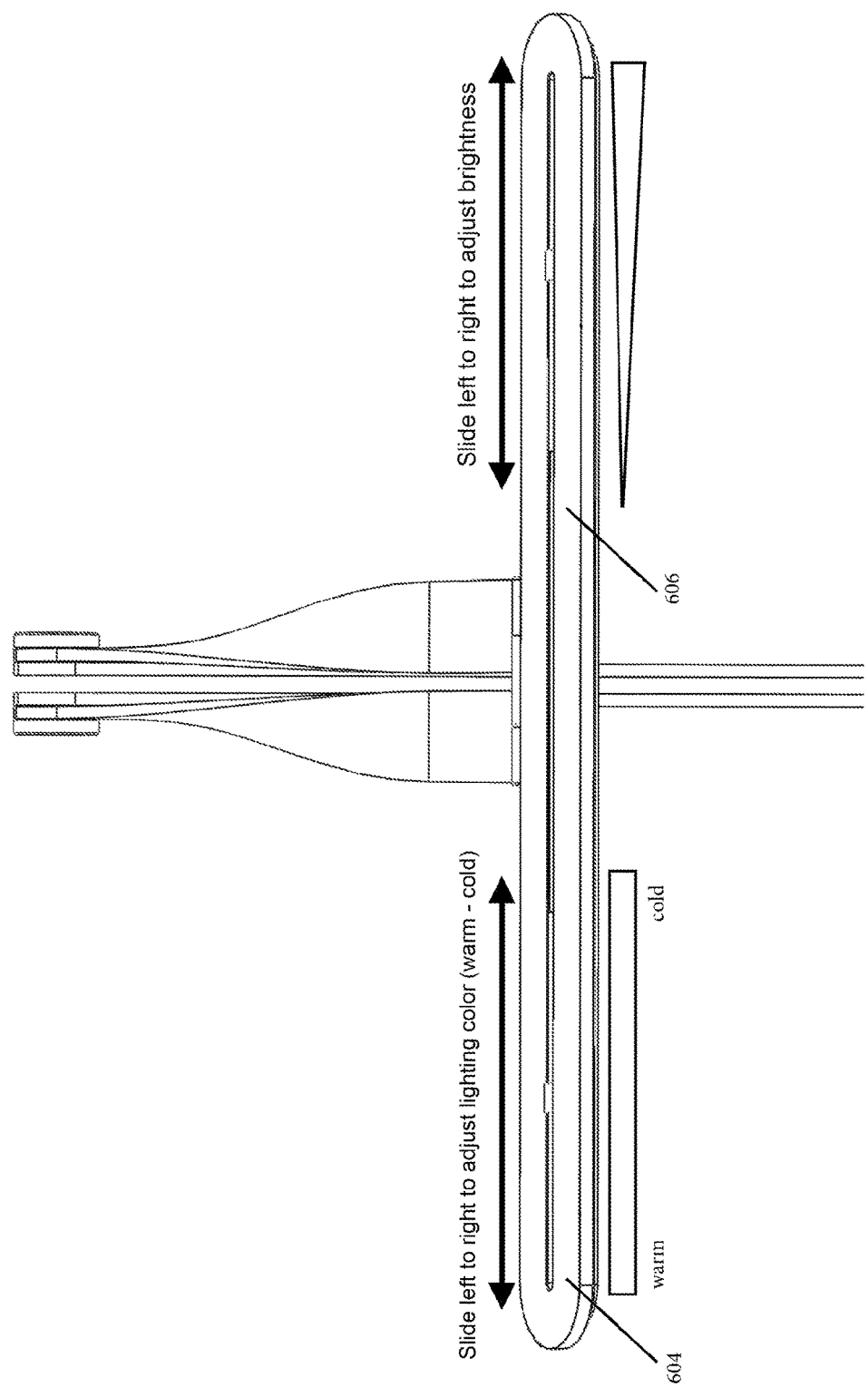
FIG. 87 depicts a front view of the light of FIG. 86 showing some functionality of the task light.

Next, with reference to FIGS. 86 and 87, the various components and functionalities of light 212 will be explained. As shown in FIG. 86, light 212 is attached to dual horizontal arms 210 via hinge 602. Hinge 602 allows light 212 to be adjusted up/down (or possibly left/right also) and provides electricity to light 212 from dual horizontal arms 210. The internal circuitry of light 212 will be explained later.

In another embodiment, light 212 may take the form of a functional device module B which is inserted into a base module A as depicted in FIGS. 1-3, for example, with the power being provided to base module A by dual horizontal arms 210 instead of via wired power supply 116. Such a modular system would allow for different lights 212 to be swapped out, as desired (e.g., longer, shorter, brighter, etc.).

Light 212, on its exterior, comprises light temperature slider 604 and dimmer slider 606. As shown in FIG. 87, sliding light temperature slider 604 to the left causes light 212 to emit warmer light while sliding light temperature slider 604 to the right causes light 212 to emit cooler light. Preferably, light temperature slider 604 allows light 212 to be adjusted from a temperature of 2900K to 12000K. In a similar manner, dimmer slider 606 controls the brightness of light 212. Sliding dimmer slider 606 to the left causes light 212 to dim (to 0 lx) whereas sliding dimmer slider 606 to the right causes light 212 to brighten (e.g., up to 2000 lx). It should be obvious that the values for temperature and brightness of light 212 are only examples and can vary depending upon the use or size of task light 200.

Light temperature slider 604 is preferably controlled by a magnet slider 608 residing in a channel 610 on top of light 212. Magnet slider 608 is held to light 212 by another magnet residing inside of light 212. Alternatively, the exterior of light 212 can be made from a magnetic material. Because magnet slider 608 is not physically connected to light 212, it can be easily changed out for other shapes and sizes of magnets depending upon the preference of a user.

Similar to light temperature slider 604, dimmer slider 606 is comprised of magnet slider 612 and groove 614. Grooves 610 and 614 may form a single continuous groove or be separated into two distinct grooves on the surface of light 212.

Light 212 further comprises an LED (light-emitting diode) array covered by a light diffuser. The LED array is composed of a plurality of different colored individual LEDs (e.g., red, blue and green). By varying the power delivered to the various LEDs in the LED array, a variety of light temperatures and brightness can be produced by light 212. A diffuser, though not required, aids in the blending of the light from the various LEDs while also making the light "softer."

Figure 88:
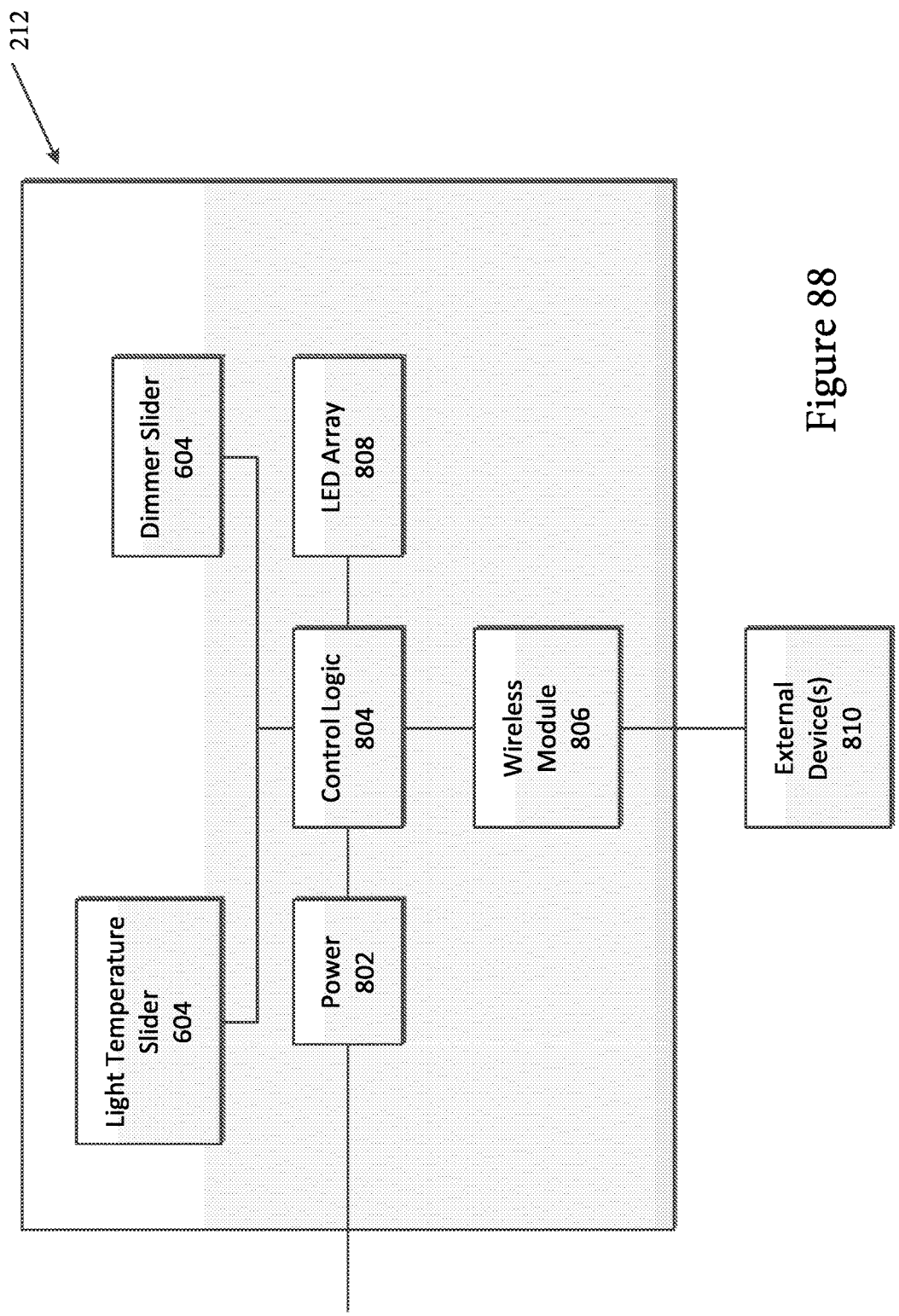
FIG. 88 depicts a schematic showing the components of the light of FIG. 86.

Referring now to FIG. 88, depicted is a schematic showing the internal components of light 212. Light 212 comprises power module 802, control logic 804, wireless module 806, and LED array 808. As shown, control logic 804 monitors light temperature slider 604 and dimmer slider 606 and adjusts the output of LED array 808 as necessary. Preferably, light temperature slider 604 and dimmer slider 606 function by compressing a membrane potentiometer between magnet sliders 608 and 612 and another magnet (e.g., a strip) located below the membrane potentiometer. Output from the membrane potentiometer allows the control logic to monitor the positions of magnet sliders 608 and 612 and to adjust LED array 808. In another embodiment, Hall sensors may be used to monitor the positions of magnet sliders 608 and 612.

Control logic 804 is also in communication with wireless module 806 which allows for wireless control of task light 200 as will be described later. Specifically, if control module 804 detects movement of magnets 608 or 612, it may override wireless module 806 to allow for manual control of LED array 808. Or, if control logic 804 detects a wireless connection to task light 200 by an external source, control logic 806 may disable light temperature slider 604 and dimmer slider 606 by not responding to movement of magnets 608 or 612.

Wireless module 806 may utilize any wireless protocol or method, known or otherwise. For example, wireless module 806 may utilize Bluetooth, Wi-Fi, Wi-Fi direct, or any combination of these protocols for communication with one or more external devices 810 which may be any device, such as a smartphone, capable of wireless communication. Connection may be limited to a single external device 810 or multiple devices. In the case of multiple connections, control logic 804 is programmed to adjust the priority of the connected devices and alter the output of LED array 808 accordingly.

Figure 89:
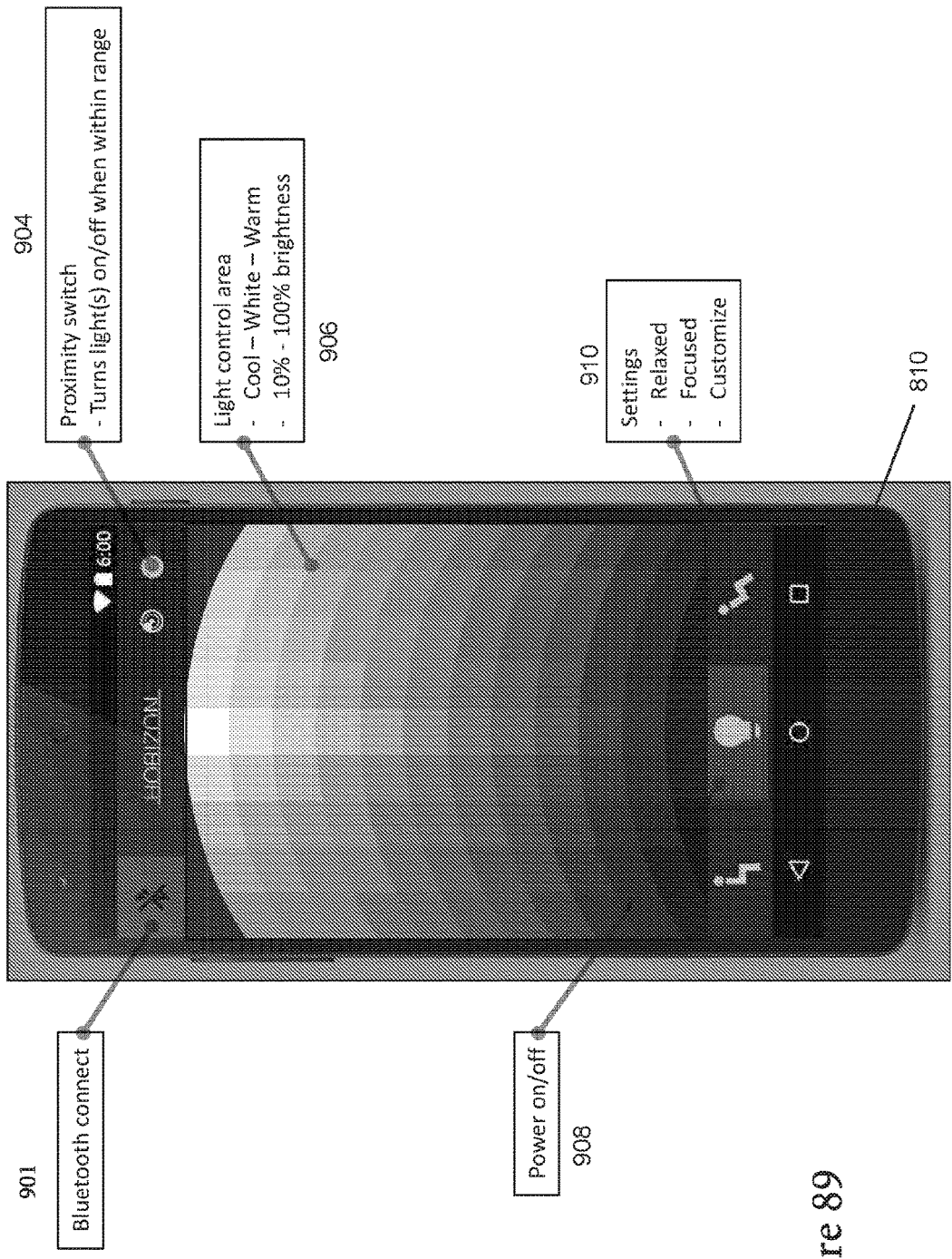
FIG. 89 depicts a sample screen of an application used for wirelessly controlling the task light of FIG. 81.

A sample application screen 900 utilized for controlling task light 200 from an external device 810 is depicted in FIG. 89. As shown, application screen 900 generally includes connection indicator 901, proximity switch 904, light control area 906, power control 908, and settings control 910. Connection indicator 901 indicates if the application is currently connected to task light 200 using an appropriate indicator. For example, if external device 810 is connected to task light 200 via a Bluetooth connection, a Bluetooth indicator is displayed. In the case that external device 810 has a touch screen, tapping connection indicator 901 can turn the wireless connection on/off.

Proximity switch 904 can be toggled on/off to turn LED array on/off if the external device 810 is within a certain range of task light 200. For example, if proximity switch 904 is on, task light 200 will be turned on whenever the external device 810 is connected and/or within a predetermined distance of task light 200.

Further, a single application, such as that depicted in FIG. 89, can be utilized to control a plurality of task lights 200. For example, the application may be able to simultaneously control all task lights 200 in an office environment (e.g., to shut them off at the end of the day). Alternatively, the application may be able to assign task lights 200 to different groups (e.g., conference rooms, cubicles, floors, etc.) and control the different groups using the single application. These features can be integrated into settings control 910 or in another part of the program.

Light control area 906 provides an intuitive interface that allows a user to completely control LED array 808. As shown, light control area 906 provides the user with a grid that allows a user to adjust the brightness of LED array 808 by sliding a finger up/down on the grid and allows a user to adjust the temperature of the LED array 808 by sliding a finger left/right on the grid.

Power control 908 allows a user to turn LED array on/off. Settings control 910 allows a user access to a number of predefined settings for LED array (i.e., combinations of brightness/temperature) or allows a user to set/save their own. Some predefined settings include, but are not limited to, the following example settings.

Energy setting: This setting is intended to be used to activate the pupils at the start of the day or after lunch. The average horizontal luminance measured at desk level is 650 lx, and the CCT (Correlated color temperature) is 12000 K (a 'cold', blue-rich white light.)

Focus setting: This setting aids concentration during challenging tasks, such as exams and tests. The average horizontal luminance measured at desk level is 2000 lx with a CCT of 6500 K (a bright white light).

Calm setting: This setting brings a relaxing ambience to support independent and collaborative learning. The average horizontal luminance measured at desk level is 300 lx with a CCT of 2900 K (white light with a warm, red color tone).

Standard setting: This lighting setting is used for regular classroom activities. The average horizontal luminance measured at desk level is 300 lx, and the CCT is 3000-4000 K (standard white light as commonly used in indoor workplaces).

As previously described, task light 200 may be connected to a plurality of external devices 810 and control logic 804 can control the output of LED array 808 accordingly. For example, many devices are now networked and can be controlled over the Internet/LAN in what is known as the "Internet of Things." Doorbells, emergency devices, thermostats, consumer appliances, etc. can be networked an interact together. In a similar manner, task light 200 can also respond to the output from connected devices. If the doorbell rings, it may cause LED array 808 to blink in a certain pattern or color. Or, if a washing machine has finished its cycle, it may alert the user by having LED array flash.

Task light 200 can also function as an alarm clock. In a home bedroom setting, task light 200 can gradually increase the brightness of LED array 808 to simulate a sunrise or gradually decrease the brightness of LED array 808 to simulate a sunset or the end of a work day. These features can be controlled from an application running on an external device 810 or by other smart connected devices, such as an outdoor light sensor.

Task light 200 can also be used to alter users to email alerts, phone calls, Twitter updates, calendar reminders, meeting reminders, etc. Control module 804 may also be "smart" in that it can use a combination of input to change the output of LED array 808. For example, if control module receives a meeting reminder and detects that the user is still in proximity of task light 200 at the timing of the meeting, it may cause LED array 808 to flash brightly to remind the user that they may be late for the meeting.

In some embodiments, control module 804 may also monitor the activity of the user by connecting to a fitness tracker or by monitoring the proximity of the user. For example, control module 804 may cause LED array 808 to flash if it has detected that the user has been sedentary for an extended period of time (e.g., forty-five minutes or an hour). As another example, control module 804 may be wirelessly connected to a smart chair which can detect different user sitting postures by increasing brightness when the user sits, turning off light 212 when the user is not present for a period of time, or alter the user if he/she has been inactive for an extended period.

Control module 804 may also, in some embodiments, cause task light 200 to reflect the current weather. When it is cloudy or rainy, the light would be a cool blue and when sunny, the light would be warm. These settings could also be reversed to help the user feel the opposite of the current weather.

Modular connections

Figure 90:
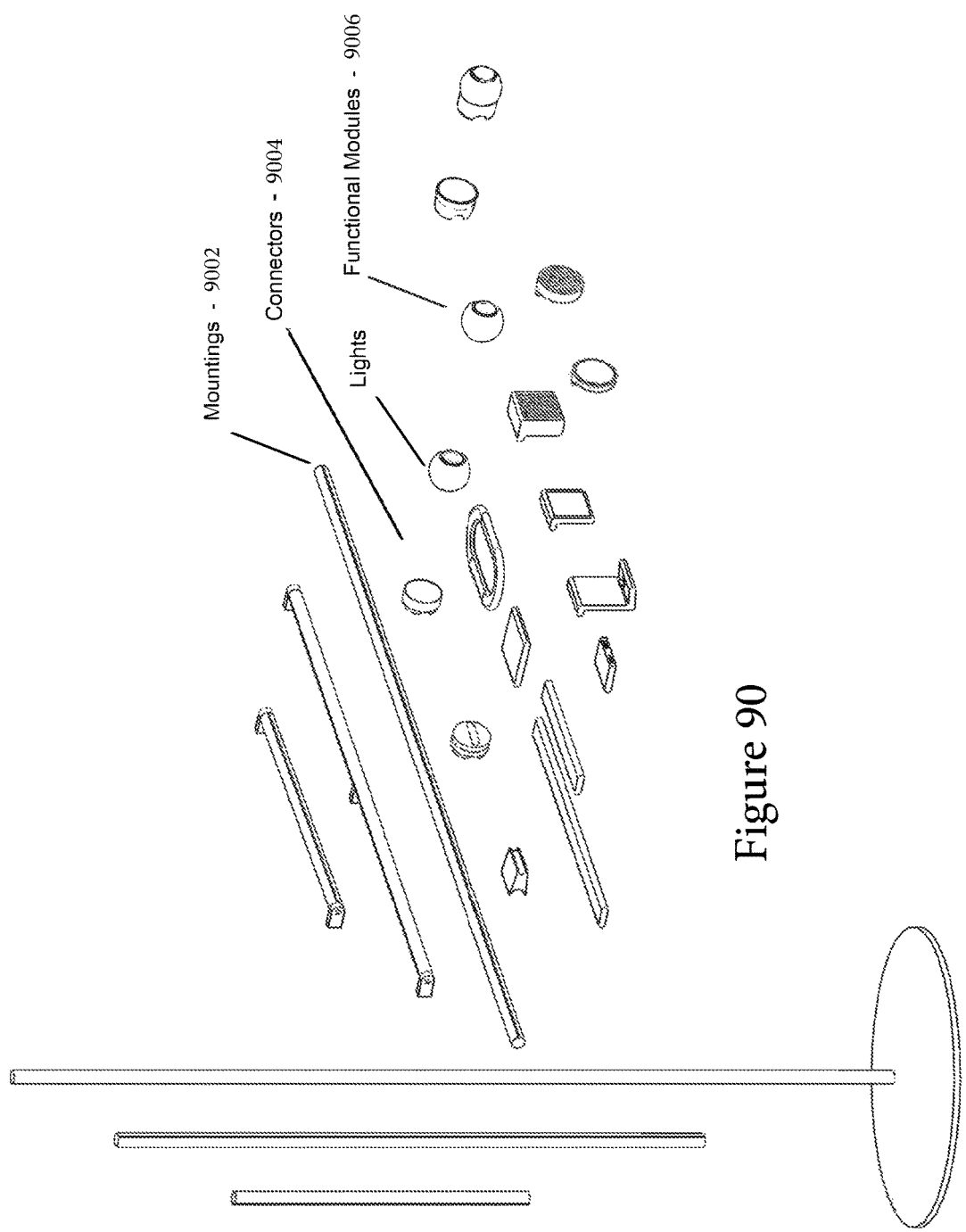
FIGS. 90-92 illustrate the various modular pieces described in the invention in various connection configurations.

FIG. 90 depicts how the various device described herein to provide a completely configurable and modular power supply and accessory system. As shown, the electrical power supplies 9002 can embody various shapes and sizes. They can be tall posts of varying diameters connected to a power supply (e.g., FIGS. 72-73) or may be attached vertically/horizontally to walls. And, as already described, a number of connectors 9004 which connect the power supplies 9002 to functional device modules 9006 have been described.

Figure 91:
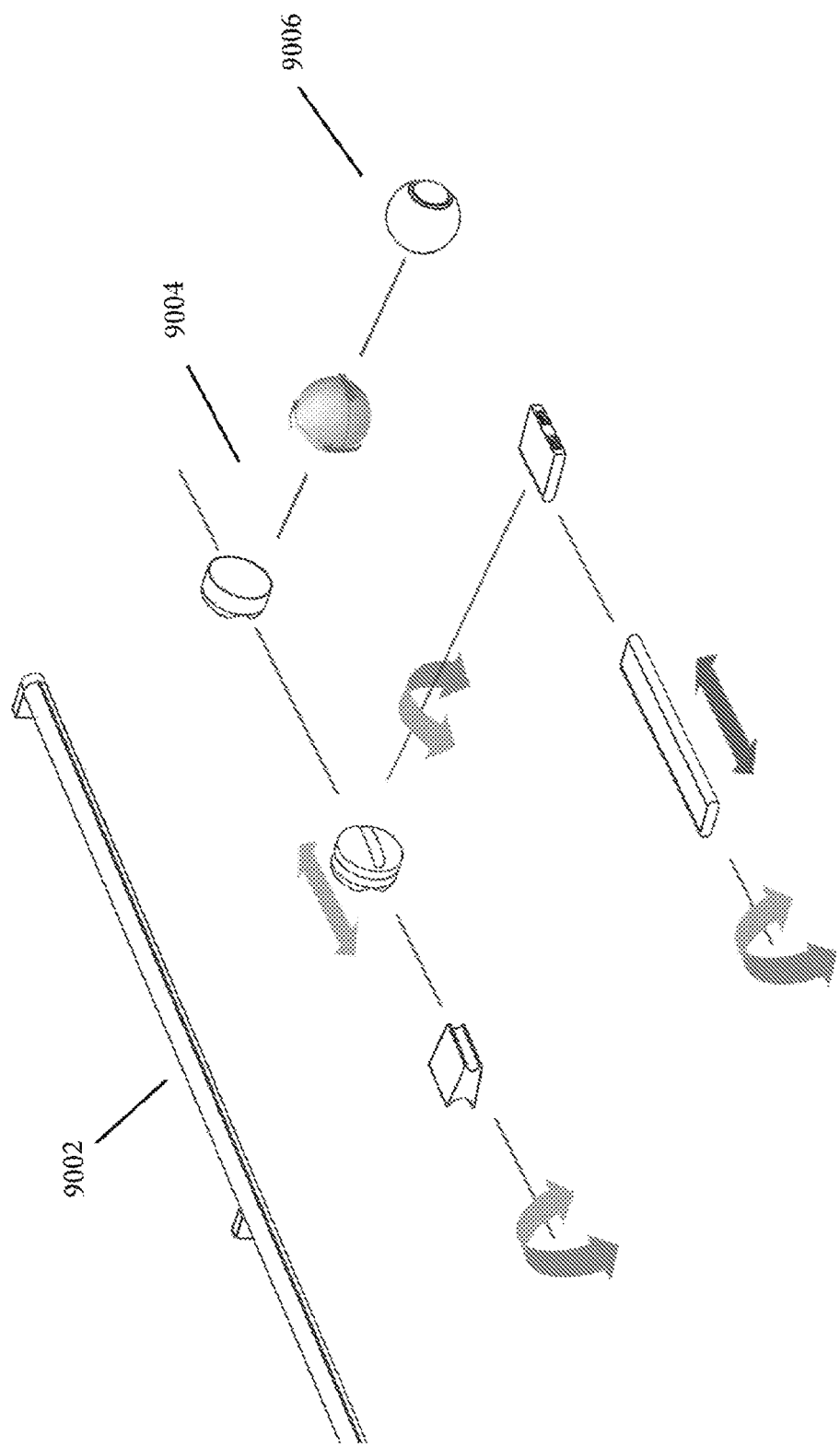

FIG. 91 depicts a more specific embodiment of a horizontal power supply 9002 which can be connected to a plurality of connectors 9004 and a plurality of functional device modules 9006. As indicated by the arrows, various degrees of rotation and translation can be obtained in the present invention not previously available, all while maintaining a constant and reliable electrical connection.

Figure 92:
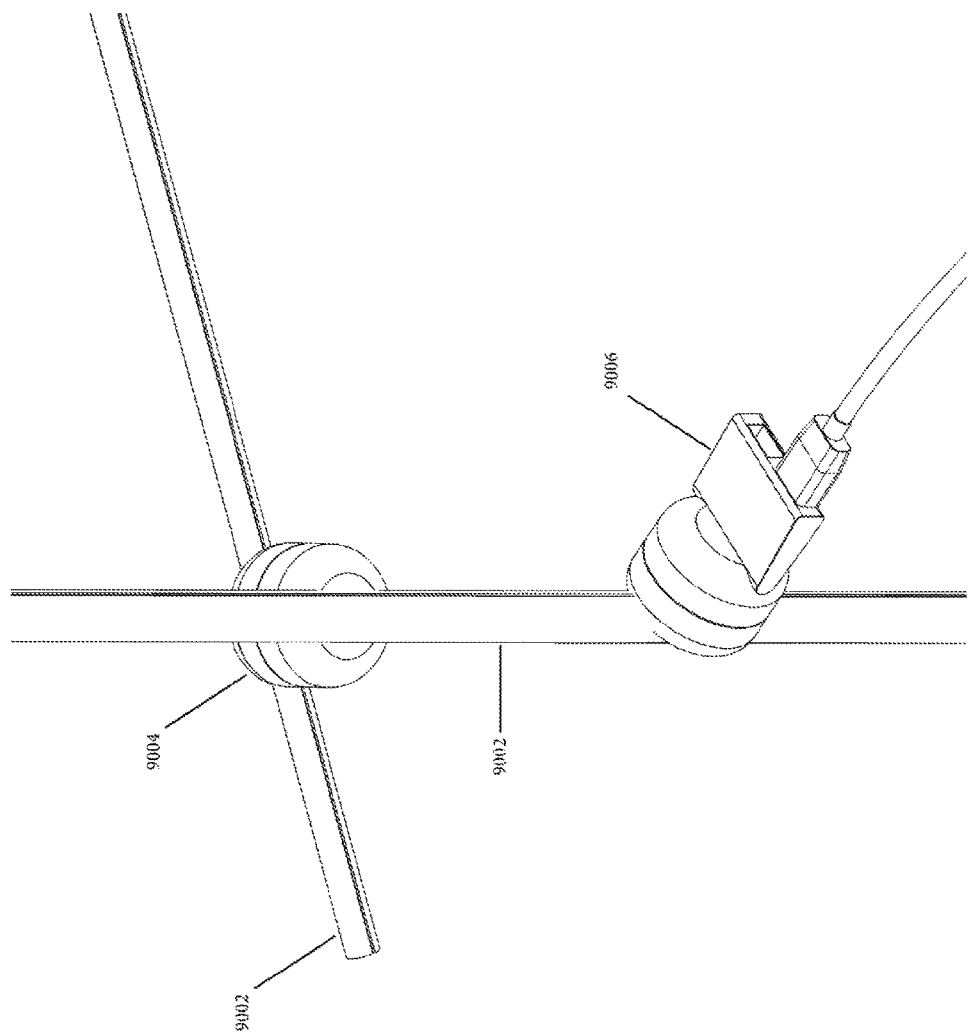

FIG. 92 specifically shows how one or more power supplies 9002 and connectors 9004 can be used to redirect the flow of electricity. Also depicted is a functional device module 9006 similar to that of FIG. 80 in which the functional device module 9006 is connected directly to power supply 9002 without an intermediate connector 9004.

The modular system of the present invention would be useful in the following non-exhaustive listing of environments:

office: furniture panel system, overhead cabinet, benching, executive suite
home: kitchen, entryway, bath, living, garage,
architectural interior, ceiling, wall,
commercial, retails, showroom, window display
museum, gallery
exhibition trade show
hotels room
medical, hospital, clinic
research lab, workshop

The invention claimed is:

1. A modular electrical connector comprising:
a magnet;
a first insulating sheet covering a first side of the magnet;
a second insulating sheet covering a second side of the magnet, the second side of the magnet being opposite the first side of the magnet;
a first ferrous metal sheet attached to the first insulating sheet;
a second ferrous metal sheet attached to the second insulating sheet;
wherein the first ferrous metal sheet and the second ferrous metal sheet extend a predetermined distance beyond an end of the magnet to form a first channel having a first predetermined separation, and
wherein the magnet magnetizes the first ferrous metal sheet and the second ferrous metal sheet;
a first electrical connector connected to the first ferrous metal sheet for providing a first voltage; and
a second electrical connector connected to the second ferrous metal sheet for providing a second voltage different than the first voltage.

2. The modular electrical connector according to claim 1, wherein the first channel extends an entire length of the magnet.

3. The modular electrical connector according to claim 1, further comprising:
a functional device module comprising:
a convex protrusion comprising a first ferrous metal connector and a second ferrous metal connector,
wherein the first ferrous metal connector and the second ferrous metal connector extend along a length of the convex protrusion, and
wherein the first ferrous metal connector and the second ferrous metal connector are separated by a gap or an insulating material;

wherein power is supplied to the functional device module by magnetically connecting the first ferrous metal connector to the first ferrous metal sheet and magnetically connecting the second ferrous metal connector to the second ferrous metal sheet along the first channel,
wherein functional device module is releasably attached to the first channel by a magnetic connection provided by the magnet.

4. The modular electrical connector according to claim 3, wherein the connection of the functional device module to the first channel provides for two degrees of freedom of movement of the functional device module along the first channel.

5. A modular power supply system comprising:
a power supply comprising:
an insulating core having a substantially circular cross section;
a first metal sheet supplied with a first voltage; and
a second metal sheet supplied with a second voltage different than the first voltage,
wherein the first metal sheet and the second metal sheet are arranged parallel along a surface and a length of the insulating core,
wherein the first metal sheet and the second metal sheet are separated by an insulating material or a gap;
and a connector comprising:
a magnet;
a first insulating sheet covering a first side of the magnet;
a second insulating sheet covering a second side of the magnet, the second side of the magnet opposite the first side of the magnet;
a first ferrous metal sheet attached to the first insulating sheet; and
a second ferrous metal sheet attached to the second insulating sheet;
wherein the first ferrous metal sheet and the second ferrous metal sheet extend a predetermined distance beyond an end of the magnet to form a channel,
wherein the magnet magnetizes the first metal sheet and the second metal sheet,
wherein the connector is releasably attached to the power supply by magnetically connecting the first ferrous metal sheet to the first metal sheet and the second ferrous metal sheet to the second metal sheet.

6. The modular power supply system according to claim 5, wherein the connector further comprises:
a second channel formed by the first ferrous metal sheet and the second ferrous metal sheet extending beyond a second end of the magnet opposite the first end of the magnet.

7. The modular power supply system connector according to claim 6, further comprising:
a functional device module comprising:
a convex protrusion comprising a first ferrous metal connector and a second ferrous metal connector,
wherein the first ferrous metal connector and the second ferrous metal connector extend along a length of the concave protrusion, and
wherein the first ferrous metal connector and the second ferrous metal connector are separated by a gap or an insulating material;
wherein power is supplied to the functional device module by magnetically connecting the first ferrous metal connector to the first ferrous metal sheet and magnetically connecting the second ferrous metal connector to the second ferrous metal sheet along the second channel.

8. The modular power supply system according to claim 5, wherein the connector further comprises:
a housing covering an outer surface of the connector, wherein ends of the first channel and the second channel protrude into a first concave channel and a second concave channel, respectively, of the housing.

9. A modular power supply system comprising:
a power supply comprising:
a first metal sheet supplied with a first voltage; and
a second metal sheet supplied with a second voltage different than the first voltage,
wherein the first metal sheet and the second metal sheet are arranged parallel and separated by a first predetermined separation; and
a functional device module comprising:
a magnet;
a first insulating sheet covering a first side of the magnet;
a second insulating sheet covering a second side of the magnet, the second side of the magnet being opposite the first side of the magnet;
a first ferrous metal sheet attached to the first insulating sheet;
a second ferrous metal sheet attached to the second insulating sheet;
wherein the first ferrous metal sheet and the second ferrous metal sheet extend a predetermined distance beyond an end of the magnet to form a first channel having a second predetermined separation substantially similar to the first predetermined separation;
wherein the magnet magnetizes the first ferrous metal sheet and the second ferrous metal sheet, and
wherein power is provided to circuitry in the functional device module by magnetically attaching the first ferrous metal sheet to the first metal sheet and the second ferrous metal sheet to the second metal sheet.

10. The modular power supply system according to claim 9, wherein the functional device module further comprises a lighting module and a wireless control module,
wherein the wireless control module allows remote control of the lighting module.

11. The modular power supply system according to claim 9, further comprising;
a second functional device module magnetically coupled to the first channel.

12. A modular electrical connector comprising:
a magnet;
a first insulating sheet covering a first side of the magnet;
a second insulating sheet covering a second side of the magnet, the second side of the magnet being opposite the first side of the magnet;
a first ferrous metal sheet attached to the first insulating sheet;
a second ferrous metal sheet attached to the second insulating sheet;
wherein the first ferrous metal sheet and the second ferrous metal sheet extend a predetermined distance beyond an end of the magnet to form a first channel having a first predetermined separation, and
wherein the magnet magnetizes the first ferrous metal sheet and the second ferrous metal sheet;
a power supply comprising;
a first metal sheet supplied with a first voltage; and a second metal sheet supplied with a second voltage different than the first voltage, wherein the first metal sheet and the second metal sheet are arranged parallel and separated by a second predetermined separation greater than the first predetermined separation;

wherein the first ferrous metal sheet comprises a first extension and the second ferrous metal sheet comprise a second extension, the first extension and the second extension together forming a second channel, and wherein the second channel has a thickness approximately the same as the second predetermined distance.

13. The modular electrical connector according to claim 12, wherein the magnet magnetizes the first extension and the second extension, wherein the modular electrical connector can be releasably attached to the power supply by placing the first extension adjacent the first metal sheet and the second extension adjacent the second metal sheet to form a magnetic connection.

* * * * *